US010832256B2

(12) United States Patent
Degeneffe et al.

(10) Patent No.: US 10,832,256 B2
(45) Date of Patent: Nov. 10, 2020

(54) GEOLOCATION COMPLIANCE FOR A MOBILE WORKFORCE

(71) Applicant: Schneider Enterprise Resources, LLC, Green Bay, WI (US)

(72) Inventors: Mike Degeneffe, Kewaunee, WI (US); Shaleen Devgun, Appleton, WI (US); Stephen John Pauls, De Pere, WI (US); Daniel G. Schmidt, Green Bay, WI (US); Christopher B. Lofgren, Green Bay, WI (US)

(73) Assignee: Schneider Enterprise Resources, LLC, Green Bay, WI (US)

(*) Notice: Subject to any disclaimer, the term of this patent is extended or adjusted under 35 U.S.C. 154(b) by 0 days.

(21) Appl. No.: 16/189,252

(22) Filed: Nov. 13, 2018

(65) Prior Publication Data

US 2019/0080335 A1 Mar. 14, 2019

Related U.S. Application Data

(62) Division of application No. 15/353,049, filed on Nov. 16, 2016, now Pat. No. 10,339,536.

(60) Provisional application No. 62/421,507, filed on Nov. 14, 2016, provisional application No. 62/256,355, filed on Nov. 17, 2015.

(51) Int. Cl.
*G06Q 30/00* (2012.01)
*G06Q 10/10* (2012.01)
*H04W 4/021* (2018.01)

(52) U.S. Cl.
CPC ....... *G06Q 30/018* (2013.01); *G06Q 10/1091* (2013.01); *H04W 4/021* (2013.01)

(58) Field of Classification Search
CPC ......... H04W 4/021; H04W 4/18; H04W 4/08; G06Q 10/1091; G06Q 30/018; G06Q 30/00
USPC .................................... 705/26.1, 30, 32, 28
See application file for complete search history.

(56) References Cited

U.S. PATENT DOCUMENTS

| 5,289,368 | A | 2/1994 | Jordan et al. |
|---|---|---|---|
| 5,842,181 | A | 11/1998 | Fanjoy |
| 6,072,396 | A | 6/2000 | Gaukel |
| 6,100,806 | A | 8/2000 | Gaukel |
| 6,501,421 | B1 | 12/2002 | Dutta et al. |
| 6,807,481 | B1 | 10/2004 | Gastelum |
| 6,810,328 | B2 | 10/2004 | Yokota et al. |
| 6,925,308 | B2 | 8/2005 | Goldsmith et al. |

(Continued)

FOREIGN PATENT DOCUMENTS

| CA | 3002843 A1 | 5/2017 |
|---|---|---|
| CN | 108604333 A | 9/2018 |

OTHER PUBLICATIONS

International Search Report dated Mar. 13, 2017 issued in related PCT/US2016/062499.

*Primary Examiner* — Andrew Joseph Rudy
(74) *Attorney, Agent, or Firm* — Foley & Lardner LLP

(57) ABSTRACT

A system and method that uses geo-location and a rules engine to facilitate compliance to federal, state, and local regulations as well as company policies across different jurisdictions that may have different compliance regulations. A mobile workforce may use the techniques herein to manage work assignments, report activities, and to manage and track time. This technology may be used, e.g., in the transportation industry, but is not limited to this industry.

18 Claims, 25 Drawing Sheets

(56) References Cited

U.S. PATENT DOCUMENTS

| | | |
|---|---|---|
| 6,952,732 B2 | 10/2005 | Nourbakhsh et al. |
| 7,027,997 B1 | 4/2006 | Robinson et al. |
| 7,043,365 B2 | 5/2006 | Inbar et al. |
| 7,159,778 B1 * | 1/2007 | Kochevar ............... G06Q 50/26 |
| | | 235/462.01 |
| 7,181,370 B2 * | 2/2007 | Furem ..................... E02F 9/205 |
| | | 701/50 |
| 7,218,938 B1 | 5/2007 | Lau et al. |
| 7,366,522 B2 | 4/2008 | Thomas |
| 7,515,101 B1 | 4/2009 | Bhogal et al. |
| 7,617,248 B2 | 11/2009 | Ditcharo et al. |
| 7,725,216 B2 | 5/2010 | Kim |
| 7,792,684 B2 | 9/2010 | Abernethy et al. |
| 7,844,647 B2 | 11/2010 | Abernethy et al. |
| 7,860,516 B2 * | 12/2010 | Hodges ................. H04W 4/029 |
| | | 455/456.1 |
| 7,898,423 B2 * | 3/2011 | Cavanaugh ............ H04W 4/18 |
| | | 340/573.1 |
| 7,962,356 B2 | 6/2011 | Bollenbeck et al. |
| 8,032,277 B2 | 10/2011 | Larschan et al. |
| 8,094,804 B2 | 1/2012 | Flockhart et al. |
| 8,095,279 B2 | 1/2012 | Greiner et al. |
| 8,150,011 B2 * | 4/2012 | McConnell ......... H04M 3/5175 |
| | | 379/142.1 |
| 8,341,029 B1 * | 12/2012 | Ramalingam ........ G06Q 20/202 |
| | | 705/26.1 |
| 8,374,383 B2 * | 2/2013 | Long ....................... G06K 7/14 |
| | | 382/100 |
| RE44,085 E | 3/2013 | Taylor et al. |
| 8,600,848 B2 | 12/2013 | Nielsen et al. |
| 8,626,568 B2 | 1/2014 | Warkentin et al. |
| 8,630,768 B2 | 1/2014 | McClellan et al. |
| 8,676,593 B2 * | 3/2014 | Nagpal .................. G06Q 30/02 |
| | | 705/1.1 |
| 8,788,308 B1 | 7/2014 | Cox et al. |
| 8,791,835 B2 * | 7/2014 | Zhang ................... G01S 5/0072 |
| | | 340/426.31 |
| 8,965,688 B2 | 2/2015 | Bandyopadhyay et al. |
| 9,020,848 B1 * | 4/2015 | Ridge ....................... G07C 1/10 |
| | | 705/32 |
| 9,100,454 B2 * | 8/2015 | Holden ................... H04W 4/08 |
| 9,123,005 B2 | 9/2015 | Rivere |
| 9,147,335 B2 | 9/2015 | Raghunathan et al. |
| 9,203,860 B1 * | 12/2015 | Casillas ............... H04L 63/1433 |
| 9,262,934 B2 | 2/2016 | Mohn et al. |
| 9,358,986 B2 * | 6/2016 | Hunt .................... F02D 41/2487 |
| 9,511,778 B1 * | 12/2016 | Fuentes ................. B60W 50/04 |
| 9,565,312 B2 | 2/2017 | Conway et al. |
| 9,865,009 B2 | 1/2018 | Chiang et al. |
| 10,189,479 B2 * | 1/2019 | Innes ..................... B60W 40/09 |
| 10,200,808 B2 * | 2/2019 | Meredith ............... H04W 4/029 |
| 10,255,575 B2 | 4/2019 | Warkentin et al. |
| 10,264,089 B2 * | 4/2019 | Reddy ..................... H04L 67/02 |
| 10,339,536 B2 * | 7/2019 | Degeneffe ............ G06Q 30/018 |
| 10,372,194 B2 * | 8/2019 | Abadi ................... G06F 1/3215 |
| 2002/0023157 A1 | 2/2002 | Lo et al. |
| 2002/0035421 A1 | 3/2002 | Warkentin |
| 2002/0133275 A1 | 9/2002 | Thibault |
| 2002/0165694 A1 | 11/2002 | Chene et al. |
| 2006/0106540 A1 | 5/2006 | Carpenter |
| 2008/0075268 A1 | 3/2008 | Medina et al. |
| 2010/0153171 A1 | 6/2010 | Erhart et al. |
| 2010/0312606 A1 | 12/2010 | Gala |
| 2012/0233044 A1 | 9/2012 | Burger et al. |
| 2013/0090964 A1 | 4/2013 | Rivere |
| 2013/0090969 A1 | 4/2013 | Rivere |
| 2015/0017042 A1 | 1/2015 | Landrum |
| 2015/0017402 A1 | 1/2015 | Landrum |
| 2015/0170428 A1 | 1/2015 | Harter et al. |
| 2015/0206081 A1 | 7/2015 | Lee et al. |
| 2015/0338858 A1 | 11/2015 | Bates et al. |

* cited by examiner

GEOLOCATION COMPLIANCE FOR A MOBILE WORKFORCE

CROSS-REFERENCE TO RELATED APPLICATIONS

This application is a divisional of co-pending U.S. Non-Provisional patent application Ser. No. 15/353,049, filed Nov. 16, 2016 entitled GEOLOCATION COMPLIANCE FOR A MOBILE WORKFORCE which claims benefit and priority to U.S. Provisional Application No. 62/256,355, filed Nov. 17, 2015 entitled SYSTEM AND METHOD FOR GEO-BASED REGULATION AND COMPLIANCE, and to U.S. Provisional Application No. 62/421,507 filed Nov. 14, 2016 entitled SYSTEM AND METHOD FOR GEO-BASED REGULATION AND COMPLIANCE, the disclosures of which are incorporated by reference in their entirety.

BACKGROUND OF THE DISCLOSURE 1.0 Field of the Disclosure

The present disclosure relates to a method, a system and a computer program for geo-based regulation and compliance and more particularly, to a system, method and computer program for geo-based regulation and compliance for mobile workforce, among other features.

2.0 Related Art

The nature of many jobs in today's modern economy is such that personnel routinely perform work activities in various cities, municipalities, counties, and states and cross between different jurisdictions during the same work day. For example, commercial operators, e.g., professional drivers, often cross state lines perhaps many times during a given workday and drive in and out of different cities and counties as they go about their work. Recently there has been a dramatic increase in new regulations and enforcement activity designed to control details of employment relationships.

For example, cities and states may have different rules with respect to required meal breaks, required rest breaks, sick leave entitlements, as well as unique minimum wage levels. Companies are lacking a user-friendly technological solution to track and monitor where and for how long personnel perform work activity and to capture data to ensure personnel are taking required meal and rest breaks. Such a solution, which does not currently exist, would enhance a company's ability to conduct efficient and compliant nationwide operations despite the growing patchwork of unique state and local regulations.

SUMMARY OF THE DISCLOSURE

In one aspect, the present disclosure provides a method, a system and a computer program for geo-based regulation and compliance for mobile workforce.

In one aspect, a system for geo-based regulation and compliance for mobile workforce is provided comprising a server comprising a computer configured to receive GPS location information related to a plurality of mobile units, a rules compliance module executable by a computer and configured to determine rules for a jurisdiction based on a geographic location of the plurality of mobile units, a rest break optimizer module executable by the server and configured to determine at least one rest break plan based on the geographic location of at least one of the plurality of mobile units, and configured to determine a labor law compliance plan based on the geographic location of at least one of the plurality of mobile units and a display device located in or associated with the at least one of the plurality of mobile units for receiving a directive to conform to the at least one rest break plan. The at least one of the plurality of mobile units may be configured to provide to the server in response to the directive at least one of: an opt-out of break activity, a defer break activity, a take a break activity. The system further comprising a rules engine configured to de-conflict rules for multiple jurisdictions related to a plurality of different geographic locations traversed by the at least one of the plurality of mobile units. The rest break optimizer module may be configured to determine at least one rest break plan based on different geographic locations of at least one of the plurality of mobile units, and may be configured to determine a compliance plan based on different geographic locations of at least one of the plurality of mobile units for sequencing rest breaks to maximize work break synergy, wherein the different geographic locations include jurisdictions having differing labor laws affecting the at least one rest break plan.

In one aspect, a computer-implemented method for geo-based regulation and compliance for mobile workforce comprises providing a server configured to receive GPS location information related to a plurality of mobile units, providing a rules compliance module executable by a computer and configured to determine rules for a jurisdiction based on a geographic location of the plurality of mobile units, providing a rest break optimizer module executable by the computer and configured to determine at least one rest break plan based on the geographic location of at least one of the plurality of mobile units, and configured to determine a compliance plan based on the geographic location of at least one of the plurality of mobile units. The method may further include that the plurality of mobile units are configured to receive and display from the computer a directive indicating a activity to conform to the at least one rest break plan.

In one aspect, a computer program product embodied on a non-transitory storage medium that, when read and executed by a computer, performs the steps for geo-based regulation and compliance for mobile workforce according to the computer-implemented method described above.

In one aspect, a system for geo-based regulation and compliance for mobile workforce comprises a server comprising a computer configured to receive GPS location information related to a plurality of mobile units and a rules engine module executable by a computer and configured to determine rules for a jurisdiction based on a geographic location of the plurality of mobile units, and a display device located in or associated with the at least one of the plurality of mobile units for receiving a directive to conform to at least one rest break plan.

In one aspect, a system is provided for dynamic geographic based rules management to identify and de-conflict a plurality of rules that are applicable to: i) a role of a user, ii) at least one region, and iii) at least one timeframe based on a previous geographic location of the mobile a current location of the user, at least one planned future location of the user, or any combination thereof, the system comprising: a rules engine module executing on a mobile device associated with the user; a global positioning system (GPS) device to track a plurality of locations of the mobile device; wherein the rules engine module sends geographic locations over a network to a remote geographic information service (GIS) and receives at least one region for identifying and de-conflicting the plurality of rules. The plurality of rules may be dynamically identified and comprises one or more of: predefined rules, removable rules and updateable rules. The region may comprise a jurisdiction or a geographic area. The jurisdiction may comprise a country, a county, a city, a state, a postal code area, or a predefined area. The geographic area may be defined by an organization that specifies which of the plurality of rules are to be applied to the geographic area. The rules engine module may manage the plurality of rules that align to workday requirements, work breaks, personnel pay, or tax rules. The at least one region may be a plurality of regions and the rule engine module identifies and de-conflicts the plurality of rules that are applicable to the plurality of regions. The system may further comprise a repository of the plurality of rules maintained by a server, the plurality of rules reflect laws, policy or regulations for the at least one region. The plurality of rules may reflect at least one of: organizational rules and policies for the at least one region, a tax regulation and a pay regulation. The rules engine module may dynamically identify for a predetermined duration at least one of the plurality of rules for which the user must abide based on the role of the user and the at least one future planned location. The mobile device may be associated with a vehicle.

In one aspect, a system is provided for dynamically capturing and tracking activities related to an individual; comprising: a mobile device associated with the individual; a global positioning system (GPS) device for providing GPS location information of the mobile device; and a server to receive from a computer associated with the mobile device over a wireless communication link a plurality of activities related to the individual, each of the plurality of activities including time duration information and the GPS location information of the mobile device for recording the plurality of activities, wherein the mobile device determines compliance to a set of dynamic rules and generates a notice when not in compliance to initiate renewed compliance. The set of dynamic rules may define activities that require completion by the individual over time to satisfy at least one rule and wherein each of the received plurality of activities is used to determine compliance with the at least one dynamic rule. The set of dynamic rules may define activities that require completion by the individual to satisfy a plurality of the set of rules and wherein each of the received plurality of activities is used to determine compliance with the set of dynamic rules. The set of dynamic rules are applicable to the plurality of jurisdictions and reflect laws or regulations for the plurality of jurisdictions. Activities may be created to capture tasks associated with the set of rules, compensable work, or billable work. The mobile unit may comprises a vehicle. The vehicle may be configured to provide event data to the mobile device, the event data including at least one of: a current speed, an odometer reading and a power-take-off state. The mobile device may use the event data to generate an activity for use in determining compliance to the set of dynamic rules. The server may be configured to send new activity types to the mobile unit, the new activity types for satisfying existing rules, new rules or for recording billable or compensable work. The server may be configured to send new event types to the mobile unit, the new event types for creating new types of activities.

In one aspect, a computer-implemented method is provided for dynamically capturing and tracking activities related to an individual, comprising: receiving a plurality of activities related to an individual, each of the plurality of activities including time duration information and GPS location information of a mobile unit associated with the individual; determining compliance or non-compliance to the plurality of rules based on the received plurality of activities, the plurality of rules applicable to the plurality of regions and reflect laws or regulations for the plurality of regions; and providing a warning notification to the mobile unit before non-compliance occurs or sending a non-compliance notification when non-compliance occurs. The step of determining compliance may include determining activities that require completion by the individual over time to satisfy at least one of the plurality of rules and wherein each of the received plurality of activities is used to determine compliance with the at least one of the plurality of rules. The computer-implemented method may further comprise sending a non-compliance notification to a third-party when non-compliance is determined. The mobile unit may comprise a vehicle. The computer-implemented method may further comprise receiving event data at a mobile device, the event data including at least one of: a current speed, an odometer reading and a power-take-off state. The computer-implemented method may further comprise generating an activity based on the received event data for use in determining compliance to the plurality of rules. The computer-implemented method may further comprise sending by the server new activity types to the mobile unit, the new activity types for satisfying existing rules or new rules. The computer-implemented method may further comprise sending by the server new event types to the mobile unit, the new event types for creating new types of activities.

In one aspect, a system is provided to optimize a plan of activities for a workday and to monitor the plan for compliance, comprising: an optimizer module executing on a computer that receives work tasks to be performed by an individual for a work period; an interface to a geographic information system (GIS) tool, the GIS tool configured to provide to the optimizer module a route based on projected destinations related to the work tasks, wherein the optimizer module creates an optimized work plan for the individual including an optimized break plan based on the received work tasks and the route; and a compliance module executing on a computer that receives geographic location information from a GPS device indicative of at least one location of the individual over a time period, the compliance module monitoring compliance to the optimized work plan including the optimized break plan and creating an alert when not in compliance. The compliance module may monitor compliance to the work plan based on received event data related to a vehicle associated with the individual. The individual may be a vehicle operator and the work plan may be presented to a mobile unit for viewing by the individual on a display thereby creating a cohesive experience to the individual which is the work plan that includes the route, the work tasks, workday expectations, the optimized break plan, monitoring and sequencing thereof. The compliance module may monitor the work plan throughout a workday, and includes receiving an event and translating the event to an activity to satisfy at least one rule associated with the work plan. The optimizer module may create an optimized break plan to identify and de-conflict at least one rule based on a starting location, an ending location and zero or more intermediary locations. The at least one rule may reflect a law, a company policy or a regulation for at least one region. The system may further comprising a rules engine module executing on the computer that identifies at least one rule requiring compliance by the individual for the optimized work plan. The at least one rule may be a plurality of rules that reflect a plurality of regions with differing labor regulations. The optimizer module resolves at least one conflict in labor regulations between at least two of the plurality of regions.

In one aspect, a computer-implemented method to optimize a plan of activities for a workday and to monitor the plan for compliance, comprising: receiving at a computer work tasks to be performed by an individual for a work period; determining at the at least one computer a route using a geographic information system (GIS) tool based on one or more geographic locations related to the work tasks, optimizing at the computer a work plan for the individual including an optimized break plan based on the received work tasks, and based on at least one rule related to a region and the determined route; receiving at the computer geographic location information from a GPS device indicative of at least one location of the individual over a time period; monitoring at the computer compliance of the individual to the work plan; and creating an alert when there is a non-compliance. The computer may comprises a computer at a vehicle associated with the individual. The one or more geographic locations may comprise a plurality of geographic locations to be traversed by the individual over the course of a workday and includes a plurality of: a starting location, an intermediate location and an ending location. The step for monitoring may monitor compliance to the work plan based on a received event related to a vehicle associated with the individual. The individual may be a vehicle operator, the computer-implemented method further comprising displaying the work plan on a display for viewing by the individual thereby creating a cohesive experience to the individual which is the work plan that includes the route, the work tasks, workday expectations, the optimized break plan, monitoring and sequencing thereof. The step for monitoring may include monitoring the work plan throughout a workday, and may include receiving an event and translating the event to an activity to satisfy the at least one rule associated with the work plan. The step for optimizing may create the optimized break plan to identify and de-conflict at least one rule based on a starting location, an ending location and zero or more intermediary locations. The at least one rule may reflect a company policy, a law for at least one region or a regulation for the at least one region. The computer-implemented method may further comprise identifying the at least one rule requiring compliance by the individual for the optimized work plan. The at least one rule may a plurality of rules that reflect a plurality of regions with differing labor regulations. The computer-implemented method may further comprising resolving at least one conflict in regulations between at least two of the plurality of regions. The computer-implemented method may further comprising modifying the work plan at a mobile unit associated with the individual to account for unexpected changes to the workday. The computer-implemented method may further comprising creating a list of required breaks based on the received work tasks and the step for optimizing optimizes the work plan to minimize time related to the route and the required breaks. The step of creating an alert may send a message to the individual, a third-party, or both. The step for monitoring determines there is an imminent non-compliance to the at least one rule, further comprising sending a notice to the individual at a vehicle before there is an actual non-compliance. The computer-implemented method may further comprising capturing one or more activities related to the individual to record compliance to the at least one rule or the work plan. The at least one rule may relate to a tax regulation or a pay regulation. The region may comprise a jurisdiction or a geographic area. The jurisdiction may comprise a country, a county, a city, a state, a postal code area, or a predefined area. The geographic area may be defined by an organization that specifies which of the plurality of rules are to be applied to the geographic area.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description, serve to explain the principles of the disclosure. No attempt is made to show structural details of the disclosure in more detail than may be necessary for a fundamental understanding of the disclosure and the various ways in which it may be practiced. In the drawings.

Figure 1:
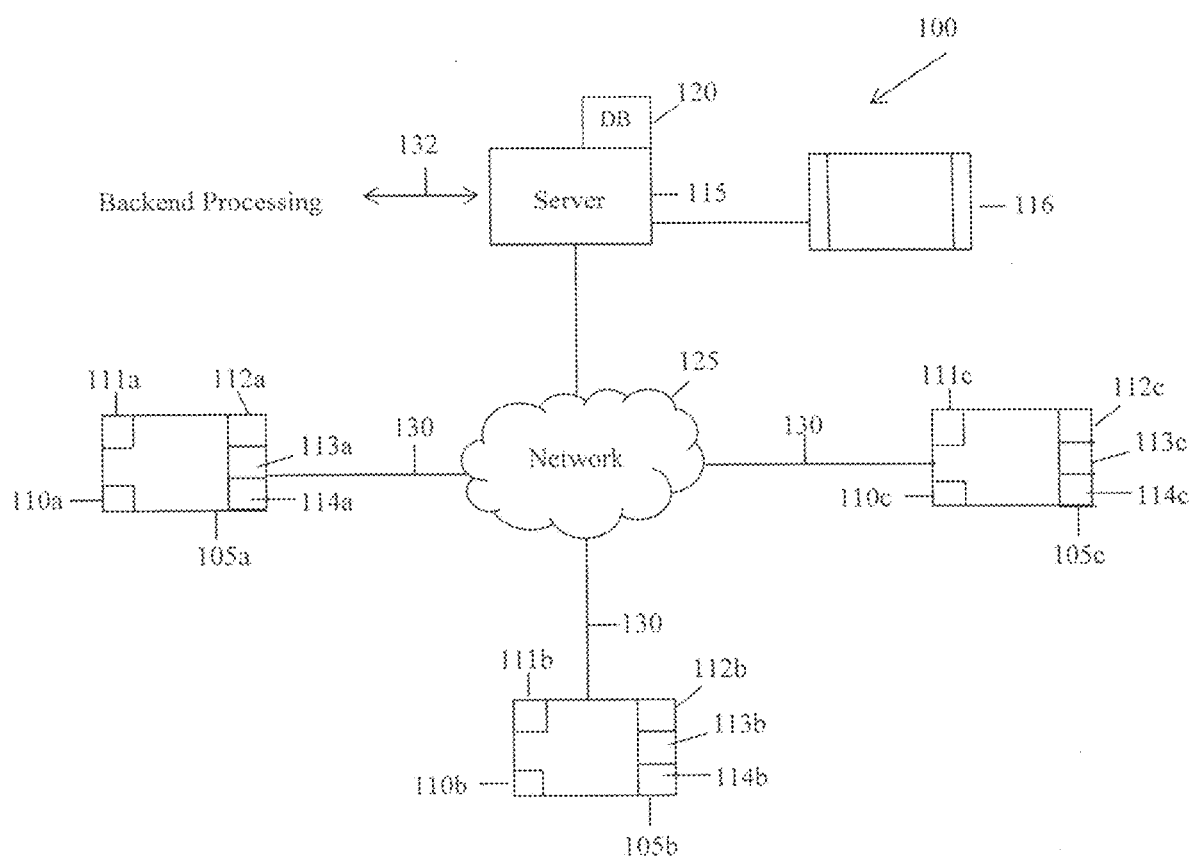
FIG. 1 is an illustrative block diagram of an example system for geo-based regulation and compliance for mobile workforce, configured according to principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", also referred to as a "computing device" or a "CPU," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, cell phone, notebook computers, desktop computers, workstation computers, servers, or the like. Further, the computer may include an electronic device configured to communicate over a communication link. The electronic device may include, for example, but is not limited to, a mobile telephone, a personal data assistant (PDA), a mobile computer, a laptop, a tablet, a stationary computer, a smart phone, mobile station, user equipment, or the like.

A "server", as used in this disclosure, means any combination of software and/or hardware, including at least one application and/or at least one computer to perform services for connected clients. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data such as a table, or organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "network," as used in this disclosure, means an arrangement of two or more communication links. A network may include, for example, a public network, a cellular network, the Internet, a local area network (LAN), a wide area network (WAN), a metropolitan area network (MAN), a personal area network (PAN), a campus area network, a corporate area network, a global area network (GAN), a broadband area network (BAN), any combination of the foregoing, or the like. The network may be configured to communicate data via a wireless and/or a wired communication medium. The network may include any one or more of the following topologies, including, for example, a pointto-point topology, a bus topology, a linear bus topology, a distributed bus topology, a star topology, an extended star topology, a distributed star topology, a ring topology, a mesh topology, a tree topology, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, ZigBee or the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise. A "pre-determined time period" and may be a period of time such as, e.g., a day, a week, month, year, one hour or several hours.

Devices that are in communication with each other need not be in continuous communication with each other, unless expressly specified otherwise. In addition, devices that are in communication with each other may communicate directly or indirectly through one or more intermediaries.

Although process steps, method steps, algorithms, functions or the like, may be described in a sequential order, such processes, methods, algorithms and functions may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other non-transitory storage medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G, 4G or 5G cellular standards, Bluetooth, ZigBee or the like. Computer readable media may be non-transitory computer readable media.

The nature of many jobs in the modern economy often requires personnel to routinely perform activities in various cities, municipalities, countries, and states and cross between such different jurisdictions during the same work day or predetermined time period. For example, commercial operators often cross state lines many times during a given workday and drive in and out of different cities and counties as they go about their work. There has been an increase in new ordinances and state laws, including an increase in enforcement activity for controlling employment relationships. For example, cities and states have different rules with respect to required meal breaks, required rest breaks, sick leave and entitlements, as well as differing minimum wage levels. Companies often do not have a technological solution to accurately track and monitor where and for how long personnel perform work activities and for capturing data to ensure regulation compliance, such as across a nationwide setting.

In one aspect, this present disclosure describes a system and method that uses geo-location and a rules engine to facilitate compliance to federal, state, and local regulations as well as company policies. Moreover, the system and methods according to principles of this disclosure may be used by a mobile workforce to manage work assignments, report activities, and to manage and track time as related to determined geographic locations, such as by global positioning system (GPS). This system and method according to principles of this disclosure may be used, e.g., in the transportation industry, but is not limited to this industry.

FIG. 1 is an illustrative block diagram of an example system for geo-based regulation and compliance for mobile workforce, configured according to principles of the disclosure. The system 100 may include one or more mobile units 105a-105c, which may include but is not limited to a vehicle 112a-112c, a computing device 110a-110c, communications unit 111a-111c, user interface 114a-114c, and a by global positioning system (GPS) 113a-113c. These may be contained in one device or multiple units connected though a common local area network (LAN).

The one or more mobile units 105a-105c may be equipped with a computing device 110a-110c to control and interface with a communications unit 111a-111c for communicating across a network 125 (which may be, e.g., a cellular network) via a communication link 130 to a server 115. The communication link 130 may be bi-directional. The computing device 110a-110c may also interface with a vehicle e.g., such as a truck, bus, or similar vehicle 112a-112c for the purpose of receiving events and providing context of the user based on vehicle operation.

The computing device 110a-110c may also interact with a user interface 114a-114c including an input device to receive input from a user and an output to convey messages and output to a user (e.g., a driver) of the one or more mobile units 105a-105c. The input device 114a-114c may comprise of but not limited to a touch sensitive screen, a keypad, a keyboard, a mouse, voice activated input device. The output device may include but not limited to a visual screen, LED or warning lights, dashboard indicators, sound such as voice or tones. The computing device 110a-110c may also interface with a GPS tracking device 113a-113c that may be configured to provide location data information of the one or more mobile units 105a-105c.

A system user such as a system manager may interact with the server 115 via an input device 116, such as to implement or manage the rules among other functions, as described more fully below. In some configurations, the input device 116 may be connected to the server 115 over the network 125.

As the one or more mobile units 105a-105c travels from one geographic location to another geographic location, the GPS tracking device 113a-113c may provide updates of the current location to the computing device 110a-110c, which in turn, may provide updates to the server 115. The updates may be continuous or may be periodic.

The system 100, in particular the server 115, may record in the database 120 activities of the one or more mobile units 105a-105c and also the associated user (as part of normal business processes) and may tag such activities with geo-locations provided by the GPS tracking device 113a-113c.

A Rule herein is a representation of government laws, regulations or company rules and policies that an individual is expected to show compliance to. In the applications herein a rule includes an expectation of an activity that needs to be performed. Rules are tied to the specific geographic regions or jurisdictions, and user roles that the law, regulations, rules or policies apply to. For example, to manage US Hours of Service, rules to represent Federal Motor Carrier Safety Administration (FMCSA) standards (Title 49 Part 395—Hours of Service of Drivers) may be created and tied to the US region with a role of drive. Likewise, to manage Canadian Hours of Service, rules to represent Canadian Council of Motor Transport Administrators (CCMTA) Commercial Vehicle Drivers Hours of Service Regulations may be created and tied to Canadian region with a role of driver. A third set of rules may be created that aligns to the Oil & Gas Related Exceptions in the Federal Hours-of-Service Rules and may be tied to a U.S. region with a role of Oilfield Driver. To ensure alignment to California labor laws, the application may include rules to manage California's Meal and Rest break laws which would be tied to California Region and all roles.

In one aspect, the computing device 110a-110c may interpret predefined rules based on work location (as provided by the GPS tracking device 113a-113c associated with a respective mobile unit 105a-105c), and may, for example, prompt a particular user associated with any one of the mobile units 105a-105c to:
1) Enter data (e.g., via input device 114a-114c)
2) Take an action (e.g., meal or rest break) and
3) Record compensable and/or billable activities (e.g., hand unload, detention, record paperwork) as a part of the user's work process.

The server 115 may be operatively coupled 132 to a back-end processing system (not shown) for further processing based on information gathered and/or maintained by server 115. Such back-end processing may include, e.g., payroll functions, human resource functions, management functions, report generation, billing, and the like.

Figure 2:
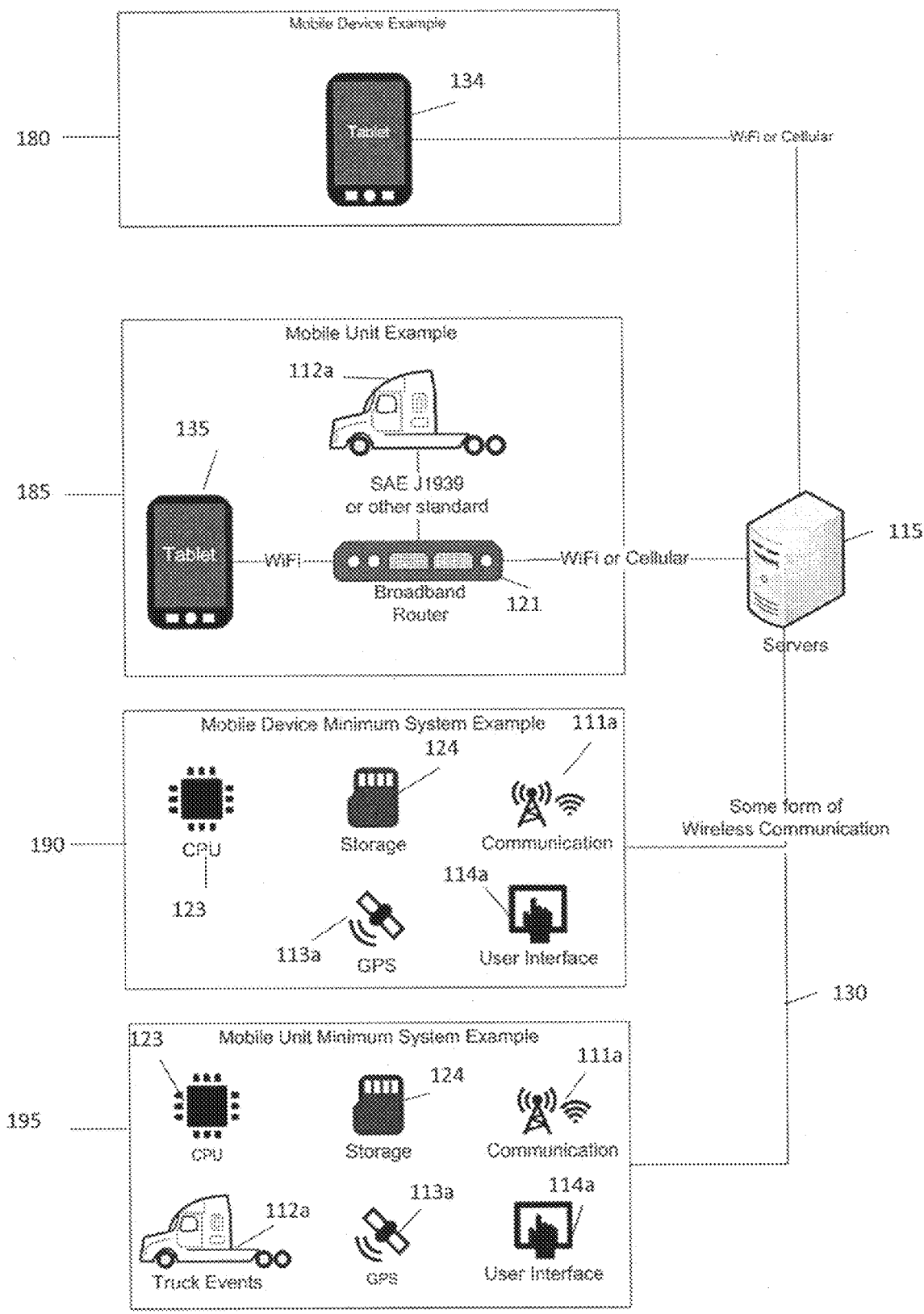
FIG. 2 is a block diagram of various example client device configurations that may be employed to provide end user functionality while interacting with a server, configured according to principles of the disclosure.

FIG. 2 is a block diagram of various example configurations of Mobile Units 185, 195 and Mobile Devices 180, 190 that may be interacting with a server, configured according to principles of the disclosure. Mobile Units 185, 195 may be required to satisfy the FMCSA electronic logging (ELD) mandate as they include a connection to the vehicle 112a-112c using a standard vehicle connection such as SAE J1939. SAE J1939 supports real-time control functions, simple information exchanges, and diagnostic data exchanges between electronic control units physically distributed throughout the vehicle 112a-112c. Control units may include, e.g., odometer readout, power-take-off (PTO) engaged, engine RPM, speed indicator, tire pressure, engine status (On/Off), or similar internal readout or status. Mobile Devices 180, 190 may be used as an extension of the system and method to other industries that don't require a connection to the vehicle.

In configuration 180, a mobile device 134 such as a tablet computer, laptop or cell phone that contain, a computing device 110a-110b, communication unit 111a-111b, global positioning unit (GPS) 113a-113b and user interface 114a-114b may be used to provide end user capability.

In Configuration 185, a mobile device 135 such as a table computer, laptop or cell phone are connected to broadband router 121 using a wireless connection. The Broadband router provides connectivity to the Vehicle 112a using a standard protocol such as SAE J1708 or SAE J1939 providing vehicle events to the mobile device 135. The broadband router then provides network connectivity 111a-111c to communicate to servers 115. The mobile device 135 may contain; a computing device 110a-110b, communication unit 111a-111b and user interface 114a-114b and may contain a global positioning unit (GPS) 113a-113b. The broadband router may contain; a computing device 110a-110b, communication unit 111a-111b and may contain a global positioning unit (GPS) 113a-113b. The vehicle 112a may provide a connection to the controller area network (CAN) bus to provide events to the mobile device 135.

Configuration 190, is a depiction of a generic device recognizing that as technology advances there may be new mobile devices that contain the required components including; a CPU 123, Storage 124, communication unit 111a, global positioning unit (GPS) 113a and user interface 114a may be used to provide end user capability.

Configuration 195, is a depiction of a generic device recognizing that as technology advances there may be new Mobile Units that contain the required components including; a CPU 123, Storage 124, communication unit 111a-111b, global positioning unit (GPS) 113a-113b, user interface 114a and vehicle 112a-112c may be used to provide end user capability.

Figure 3:
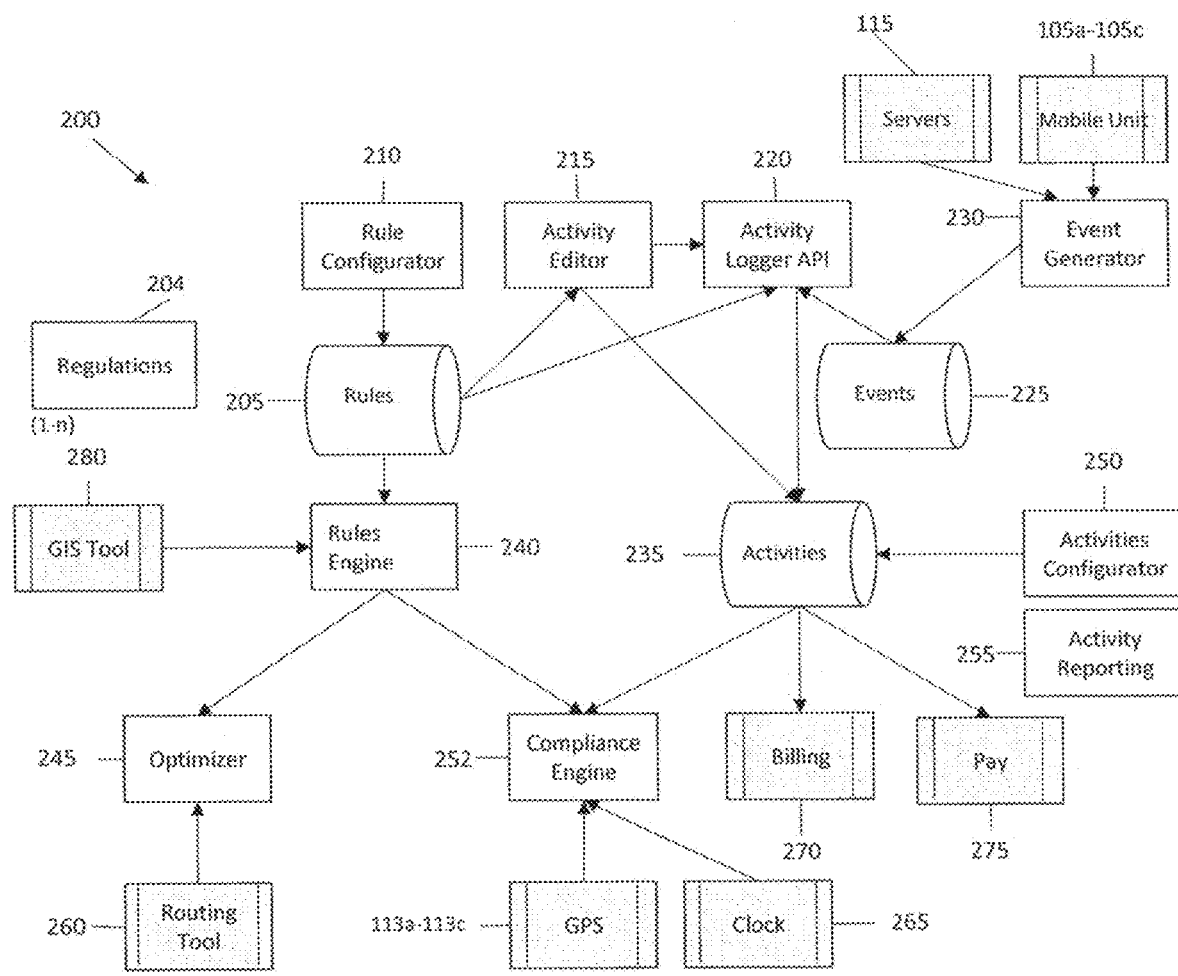
FIG. 3 is an example overview functional block diagram of a system including components for geo-based regulation and compliance for mobile workforce showing an example functional interrelationship of those components, configured according to principles of the disclosure.

FIG. 3 is an example overview functional block diagram of a system 200 including components for geo-based regulation and compliance for mobile workforce showing an example functional interrelationship of those components, configured according to principles of the disclosure. A brief introduction of these components follows, with a more detailed explanation thereafter.

An event generator 230 may monitor, read, or receive events from a vehicle 112a-112c related to statuses and states of the vehicle, a server 115 to facilitate approval process, an application deployed on computing device 110a-110c to provide app to app communication. Events may also come from a mobile device 134, 135, router 121 or from within system 200 as well. The event generator 230 may log or store these events in an events database 225. The event generator 230 and events database 225 typically are located within or associated with the respective mobile unit 105a-105c.

The activity logger application programming interface (API) 220 is a tool that may be used to provide functionality to the end user at the mobile unit 105a-105c to log their activities. The activity editor 215 is a description of a generic use of the activity logger API 220. The Activity Editor 215 may include a responsive Web Application that may permit users to create, update and delete activities after the fact (i.e., after an activity has occurred). The activities database 235 records activities as they are created or modified. The activities configurator 250 is a tool that permits a user to create, update and remove activity types in activities database 235.

The rules configurator 210 is a tool that permits a system user to create, update and remove rules in rules database 205. The rules configurator 210 may reside and execute on server 115. The rules engine 240 is a module that identifies one or more rules that a specific user may need to follow based on inputs provided. The rules engine 240 can satisfy what is needed by the optimizer 245 and compliance engines 250. Rules engine 240 may execute on the server 115, the computing device 110*a*-110*c*, or both. The geographic information system (GIS) tool 280 is a system that is designed to capture, store, manipulate, analyze, manage, and present spatial or geographical data. A GIS tool can provide information such as maps, geographic points, geo fences, region management, location lookup, historic route visualization, and such to the Rules engine 240. The GIS tool 280 may execute on server 115. The optimizer engine 245 optimizes a user of the mobile unit 105*a*-105*c*, such as a truck driver, by integrating meal and rest breaks as required by Federal, State and local authorities for a time period, for multiple jurisdictions, based on rules. The optimizer engine 245 may execute on the computing devices 110*a*-110*c*. The compliance engine 252 is configured to enforce rules based on geo-location of the mobile unit 105*a*-105*c*. The compliance engine 252 may execute on the computing device 110*a*-110*c*. In one aspect, the GPS device 113*a*-113*c* may report one of mobile units 105*a*-105*c* physical positions. A clock 265 may provide a time stamp of GPS locations and events in the system 200 overall. The routing tool 260 may be configured to provide, among other features, a route given the information provided, such as, e.g., current user of mobile unit, start location and time, stops (location and duration), end location, weather, traffic, fuel, cargo type and type of vehicle. A billing tool or system 270 may receive activity information for accounting for billable time. A pay tool or system 275 may receive activity information for assisting in appropriate pay calculation for a mobile unit user. An activity reporting module 255 may report on various activities by mobile user. The regulation resource 204 may include one or more resources for determining regulations related to various jurisdictions such as cities, counties, states, countries. This resources may be a compilation of regulations from multiple sources and may provide the guiding basis upon which rules may be created for each of the jurisdictions for which the system 100 may provide operational service. The regulation resource 204 may be manually compiled, automatically compiled from jurisdiction publications and regulations, or a combination of manual and automatic.

Rule configurator 210 is a software tool executable at server 115 that permits a system user, such as a system administrator, to create, update and remove rules. The rule configurator also provides an ability for system users to tie rules to the geographic region and user roles. Rules may also be assigned to a period rule (time period which the rule is valid). Each rule can have a notification type assigned to it. Rules may be assigned to activities and prompts via the activities configurator 250. A system user may be required to log in as a user to ensure proper permissions. Rule configurator 210 provides several functions including:

Rules Search
    This provides an ability to explore existing Rules. The search has an ability to find rules based on:
        Saved Search
            This is a drop down that contains all searches the user has saved. Selecting one populates all of the fields below.
        Rules fields
            Rule Name
            Parent
            Rule Type
            Rule Family
            Region
            Roles
            Active
        Actions
            Search
                This takes the users input, and call queries the database to find all results that match.
                Display the results in the Rules Search Results.
            Save
                This saves the user's search selection. When the user clicks save search, it may ask them to name the search.
            Clear
                This re-sets the search fields
    Rules Search Results
        The search results provide a list of all rules that match the users search.
        Data that may be displayed includes:
            Rule Name
            Rule Display Name
            Rule Value
            Rule Parent
            Rule Type
            Rule Family
            Time Period
            Overdue Notify Duration
            Notification Type
            Back Office Notification
            Warning Duration
            Warning Type
            Active
        Actions
            Export
                Export provides a delimited text file of the results of the search.
            Clicking on a row
                This opens the Rules detail page with the selected Rule.
            Delete
                This prompts a "confirm" popup. If the user confirms, the rule may be deleted.
            New
                This opens the rule detail area with none of the fields populated.
Rules Detail
    The Rules detail area provides additional detail and information for the user to create, update and view a rule. If the page was called with a rule it is populated with the data about that rule. If it was created by selecting the new button, it may populate with no data filled in.
    Fields
        Rule Name
            The rule name is the name of the rule. It is used in all configuration tools, and back end systems.
            The rule name should be descriptive of the rule, and to benefit users, unique names make maintenance easiest.

This is a free form text field

Rule Display Name
  The rule display name is what the end user sees. Often this rule will not be unique.
  Rule Name, Rule Display, Name Examples (California Lunch Break, 30 min break), (HOS 30 min Break, 30 min break)
  This is a free form text field Rule Value
  This is the value that the rule applies to. The Rule Type determines what this value means. For example, if it is a "Break" Rule it will be the time in minutes that a break must be taken. Work Day rules indicate a maximum amount of time in minutes. If it is a pay rule, it may be a currency value.

Parent
  If a rule has a parent, it supersedes the parent rule. The user is able to select only one rule to be the parent.

Rule Type
  Rule types is used to classify a specific high level grouping of rules.
  A rule can have only one rule type.
  Types include:
  Work Period
  Break
  Pay
  Tax Rule Family
  A rule family is a way to group rules that are part of the same regulation. Rule family indicates that specific rules cannot be satisfied by the same activity.

Region
  Region is important, as a rule cannot exist without a region. A region represents a geographic area to which the rules apply. How the system user identifies and assigns the region to the tool depends on the GIS system used.

Period
  A period represents the time period that a rule is valid. There can be a number of time periods. Only one period type can be selected.

Roles
  This is a list of the end user roles to which the rules apply. If no roles are selected, the rule is valid for all roles.

Overdue Notify Duration
  This indicates the time when a notification should be generated indicating an activity is overdue.
  9999=do not notify
  Number can be positive or negative. Negative represents minutes after rule was supposed to be satisfied.

Overdue Notification
  Type of notification to provide to the user (Sound, Image, Text)
  Value
  if Sound or Image Type are selected, this may be a file path to where the sound may be on the device.
  if it is Text, this should include the text message to provide to the end user.

Back Office Notification
  This is a checkbox that indicates someone in the back office should be notified that the user is not in compliance.

Warning Duration
  This indicates the time when we should notify that an activity is coming up.
  9999=do not notify
  Number can only be positive. Minutes before rule is supposed to be satisfied.

Warning Notification
  Type of notification to provide to the user (Sound, Image, Text)
  Value
  if sound or image type are selected, this may be a file path where the sound is located on the device.
  if it is text, this should include the text message to provide to the end user.

Active
  Check Box that indicates whether a rule should be used. If Active=False, the system ignores it completely.

Actions
  Save
    Create or update the rule in the database.
  Cancel

Rules Engine 240 is a tool running at the server 115, the mobile unit 105a-105c, or both, and is configured to identify the rule or rules that a specific mobile unit 105a-105c user needs to follow based on inputs provided. To determine if a mobile unit 105a-105c user is required to satisfy a rule, three pieces of information is required: i) what role(s) the mobile unit 105a-105c user is performing, where the particular mobile unit 105a-105c is, and the timeframe a rule needs to be satisfied. Once a rule is identified as applying to the user, the rule is added to the specific user's "Rules for Period" table (as part of the Rules database 205).

The following are example types of rules that may be configured and enforced.
  a. Workday: Workday rules manage items such as the maximum/minimum period of time for a work day, overtime rules, FMCSA 70 hour rules & restarts. Workday rules may be tied to break rules as more complex break rules may apply to specific workdays.
  b. Break: Break rules manage regulations and policies such as mandated paid and unpaid breaks, lunch breaks and other activities with a mandated minimum duration.
  c. Pay: Pay rules may be used to manage items such as varying minimum wage by region, and items such as per diem, hazard pay or millage premium for specific geographic area.
  d. Income, Sales and Use Taxes: These rules may be used to support organizations or individuals who need to pay taxes specific to a geography such as International Fuel Tax Agreement (IFTA) Tax.

Rules may also be tied together and configured to work with each other.
  a. In some cases, rules may be configured to ensure they don't overlap
    i. Example: 3 break rules may be required to support current California laws that may require 2, 10-min breaks and 1, 30-min break. As a result, all 3 breaks may not be considered satisfied when the driver takes 1, 30-min break.
  b. In other cases, rules can be configured to allow overlap.
    i. Example: The FMCSA 30 min break requirement if driving for more than 8 hours can overlap with California's 30 min meal break rule. This way when the user takes their 30 min break both rules are satisfied.

Rules can be in a hierarchy, where a child rule may supersede the parent rule
  a. Example: Minimum wage for the United States is currently $7.25, Illinois is $8.25 and Chicago, Ill. is currently $10.50. As Chicago is within the Illinois region (parent) it would supersede Illinois and the United States which would be Illinois regional parent.
Rules can be tied to a position, job or work configuration.
a. Example: Sometimes rules in the same region may be different for specific work configuration. In the trucking industry, the rules in the United States region are different for Farm Use, Over the Road, Oil Field, Port Dray Short Haul.

Rules for Time Period is a significant aspect of the system 200, and may be a first mode that other applications of system 200 may interact with the Rules Engine 240. Rules for Period may be viewed as an instance when a rule needs to be applied, and may include the following attributes:

User ID—The user that must comply to this rule
Rule—The rule identification that needs to be followed
Satisfied—An indicator that lets system applications know if the user completed the rule.
  Satisfied may be checked in processes that could impact completion such as:
    When an activity is created
    When an activity is changed
    When a rule is added to rules for a period
Activity—The activity that was performed that caused satisfied to be marked true.
Valid Period Start—is a timestamp that indicates the earliest time an activity can start to satisfy this rule for period.
Valid Period End—is the timestamp that indicates the latest time an activity can start to satisfy the rule for the period.

With this information, the system 200 is able to ascertain what rules a mobile unit 105a-105c user needs to comply with, at what time based on where they have been, when and how long they were there, and the role they perform.

Update Rules for Period provides an interface for other applications of system 200 may interact with the Rules Engine 240.

Inputs
  User
  Latitude
  Longitude
  Date, Time
Output
  List (Rules for Period) or <null>

Figure 4A:
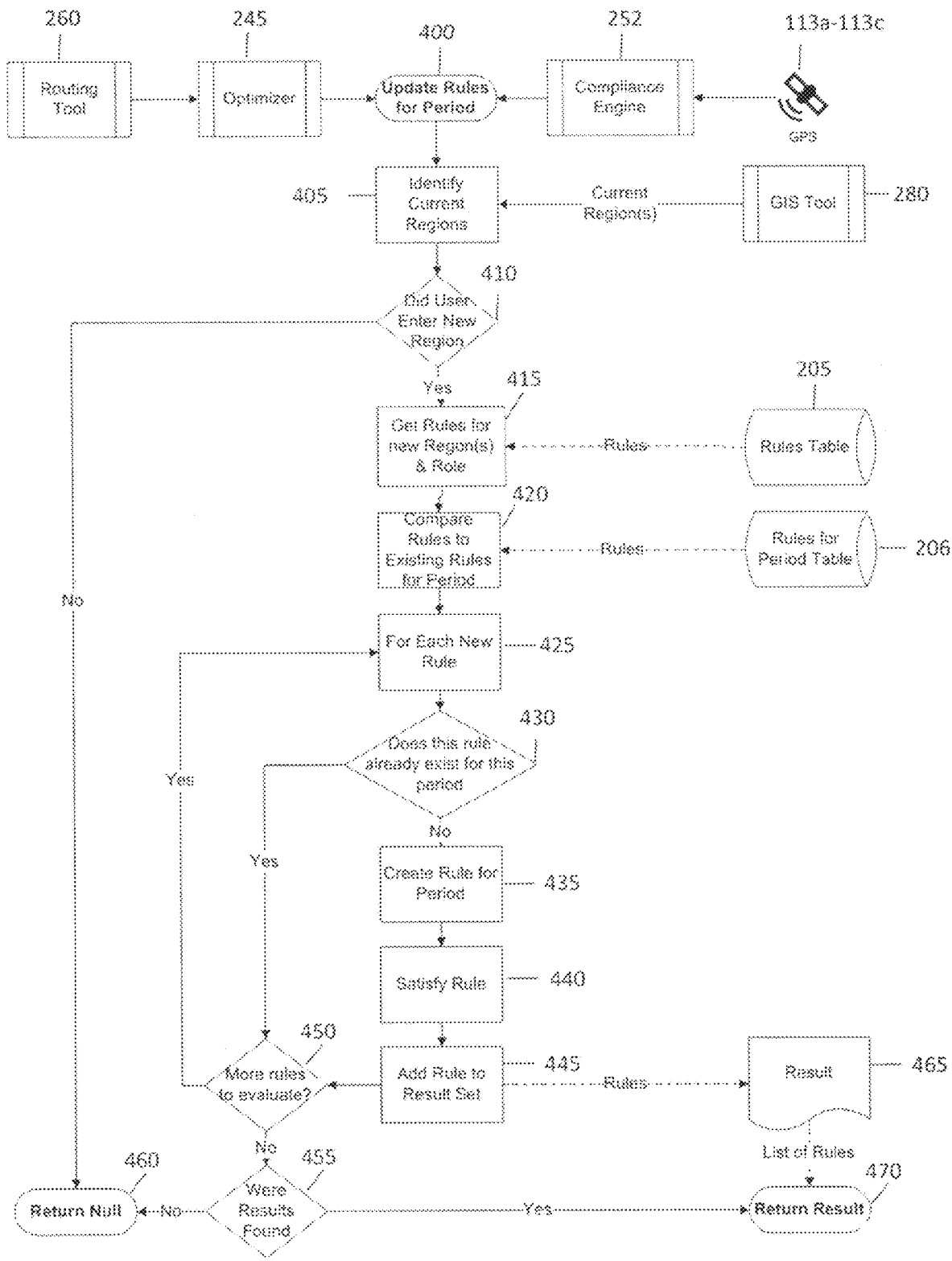
FIG. 4A is an example flow diagram of an process to update Rules for Period, performed according to principles of the disclosure.

FIG. 4A is an example flow diagram of an Update Rules for Period process used to depict a possible way to identify new rules that apply to a user, performed according to principles of the disclosure. The flow diagram of FIG. 4A (and all other flow diagrams herein) may also represent a block diagram of components that when read from a computer readable medium and executed by a computer perform the respective step. The optimizer engine 245 and compliance engine 252 may call this process starting at step 400. The optimizer engine 245 may call this process with information about points a geo position (Latitude, Longitude) and times in a route to have rules built that the mobile unit 105a-105c user may interact with. The compliance engine 252 may call every X-distance (predetermined distance) based on a GPS location (Latitude, Longitude) to find out if there is a new rule or rules for the current location. At step 405, a determination is made to identify a defined region(s) (e.g., state, county, locality) that the geo position falls into. The process may interact with a GIS system or GIS service 280 to determine the defined regions that the point falls into. Example GIS systems may include, e.g., Nokia Here®, Google Maps®, ESRI geonet, or the like. The GIS system 280 is typically configured to return a region or a set of regions for the geo position. The system can use pre-defined regions such as countries, states, postal codes and cities, or it can also use user defined regions like southwest United States.

At step 410, a check is made to determine if the mobile unit 105a-105c and user entered a new region. This may include determining if the region or set of regions are the same as the region or set of regions the mobile unit 105a-105c and user were in last time Update Rules for Period was called. If they are in the same region, then at step 460, return <null>. However, if there is a new region, at step 415 all rules are obtained for that region that apply to that user's role from the rules database 205. All existing rules for the current period for the user are obtained, including satisfied rules. At step 420, for each of the rules obtained from step 415, compare them with the existing rules for the period from the rules for period database 206. If at step 430, it is determined that the rule is already in rules for period 206, processing continues at step 450. However, if the rule is new, then at step 435, a new rule is created for the period using information passed in, and the rule found to create an instance of the rule. The results may include:
  a. User will be the user passed in.
  b. Rule will be the rule found in step 415.
  c. Using the time passed in and the rules found in the rules for period table 206 for the rule set the valid period start and valid period end dates and time.
  d. Satisfied may be set to False.
  e. Activity ID may be set to null.

When a new rule is added, it may have already been satisfied by one or more an activities. Step 440 determines if a rule has been satisfied, which may be a sub-process explained in relation to FIG. 4B below. At step 445, the new rule may be added to the result set in the rules database 205, and the new rule may be added to a result list 465 for eventual return at step 470. At step 450, a check may be made to determine if there are more rules to evaluate; if so, processing continues at step 425. If, however, there are no more rules to evaluate as determined at step 450, then at step 455 a check may be made to determine if any results were found. If no results were found, then a null result may be returned at step 460. If at least one result was found, then the result list 465 of rules may be returned at step 470.

Figure 4B:
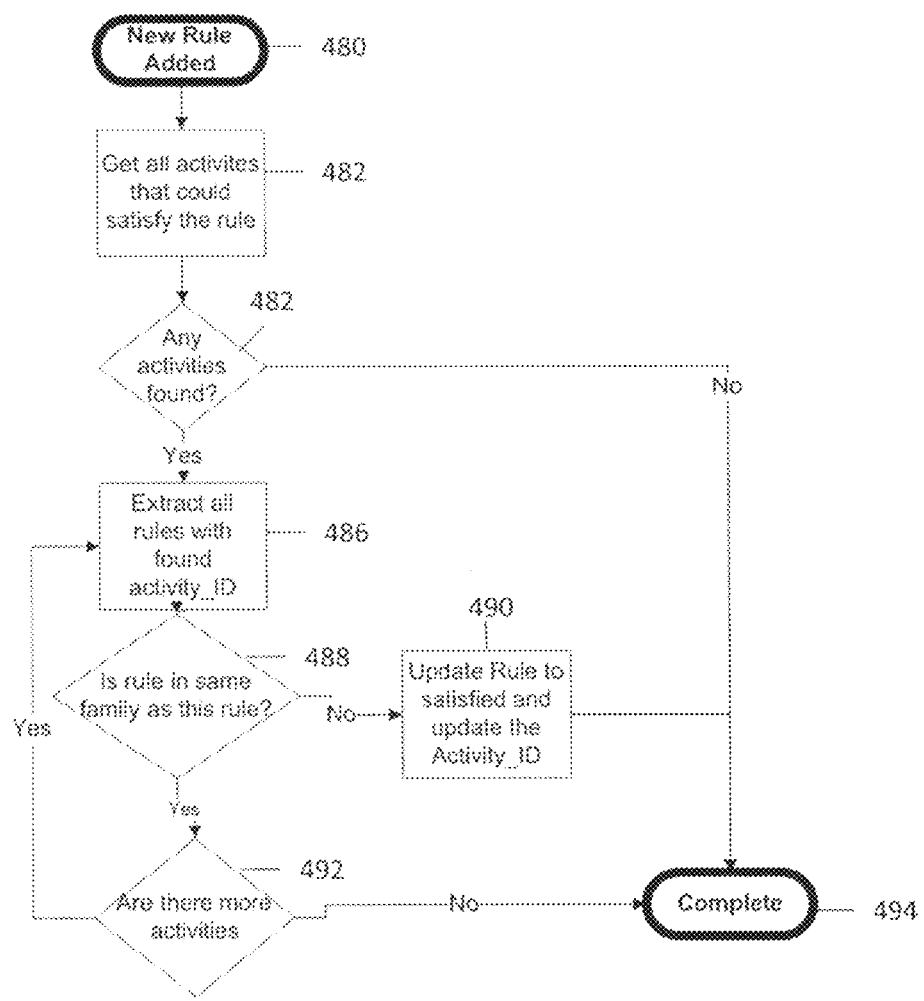
FIG. 4B is a flow diagram showing an example process to determine if a new rule is satisfied by an activity that has been previously recorded, the process performed according to principles of the disclosure.

FIG. 4B is a flow diagram showing an example process to determine if a new rule is satisfied, the process performed according to principles of the disclosure starting at step 480. This may be a sub-process callable as required such as at step 440 of FIG. 4A. At step 482, acquire all activates from the activities table 235 that could satisfy the rule by querying the activities table 235 with the following criteria: i) activity start is after the rule valid start time and date, ii) activity start is before the rule valid end time and date, and iii) through join, the rules should be associated to this activity type.

At step 484, a check is made to determine if any activities are found satisfying the rule. If no activities are found, the sub-process may complete at step 494. If there is one or more activities found satisfying the rule, then at step 486, all rules with the Activity are extracted. At step 488, a check is made to determine if the new rule is the same family as this rule. If yes, then processing continues at step 492, where a check is made to determine if there are more activities. If there are no more activities, the sub-process completes at step 494. If there are more activities, then processing continues at step 486 with the next activity. If at step 488 the new rule is not in the same family as this rule, the new rule is updated to satisfy and update the new rule with the Activity. The sub-process may end at step 494.

The optimizer 245 is an application and tool which works in conjunction with the rules engine 240 and a location based plan (e.g., a route for trucking), to provide individual associated with mobile units 105a-105c an interactive tool to plan their day including, e.g., when and where to take breaks. The optimizer 245 provides the individual associated with a mobile unit 105a-105c optimal overlap of breaks to satisfy as many regulations and policy's as possible to maximize their productivity, while still being compliant with policies and regulations for all geographic regions the individual associate with mobile units 105a-105c plans to be in.

By way of example, a driver intends to drive from Utah to California. The driver must follow the Federal Motor Carrier Safety Administration (FMCSA) Hours of Service rules the Nevada workday break rules and California workday break rules. The optimizer 235 is configured to overlay all of the rules and identify that by taking two 10 minute breaks and one 30 minute break may satisfy all rules in these jurisdictions. Moreover, the optimizer 245 is configured to further recognize that the 30 minute break needs to occur between the hours of a first time (X) and a second time (Y) to be compliant. This information permits the driver to better plan the trip, and determine when and where to take required breaks.

The optimizer 245 may accept a number of inputs to create the optimized plan including:

An origin and destination.
  Example: The driver knows they need to travel from Milwaukee, Wis. to New York, N.Y. They enter the origin, destination and start time as inputs. The optimizer 245 works with a routing software 260 to determine the route for the driver, and then may display best options for breaks that align with rules & regulations for the locales the user intends to be traveling through.

A multi-stop route.
  Example: Not all trips are direct. The driver knows that the intended travel from Milwaukee, Wis. to New York, N.Y., will have a stop in Buffalo, N.Y. The origin, destination and start time may be entered. Stops may be added with an order and indication about how long each stop may take. The optimizer 245 may employ a routing software to determine the route for the driver, and then display best options for breaks that align with rules and regulations for the jurisdictions that the user anticipates traveling through. The system 100 may automatically compensate for entering new time zones, e.g., for adjusting total times.

A route in a standardized format including stops and times for segments as well as times stopped from another application by way of an API.

The optimizer 245 may take into account all rules currently applied to an individual associate with mobile units 105a-105c as well as any new rules that may be applied during the route because of entering new regions.
  Example: As a driver who needs to follow FMCSA Hours of Service, when selecting a route going to Oakland Calif., the rules may take into account where the driver is currently located, a 14-hour shift, an 11-hour drive time, and when a 30-minute break must be taken (or if already taken). Any new rules may be taken into account that apply because the driver will be entering the California region.

As part of the optimizer 245, or as a separate route optimizer tool, a function is provided that identifies all rules that should be followed for a given route. Moreover, the optimizer 245 may be configured to identify an activity that satisfies more than one rule and may recommend that activity as a better option. Optimizer 245 may be configured to identify if the route plus activities required to satisfy necessary compliance rules may go past the individual associated with a mobile unit 105a-105c expected end of day (rule). In this case, an optimized set of rules may be returned, with a message or recommendation suggesting a different end point be created, and to re-optimize. This re-optimization may change the individual's rules due to any new geography. This functionality may be accessed directly by a custom user interface tailored for this capability which may accept a start location, an end location, and any points between. This route optimization functionality may also be accessed by another application like a trip planner that may provide another layer of detail into the individual's activities.

Figure 5:
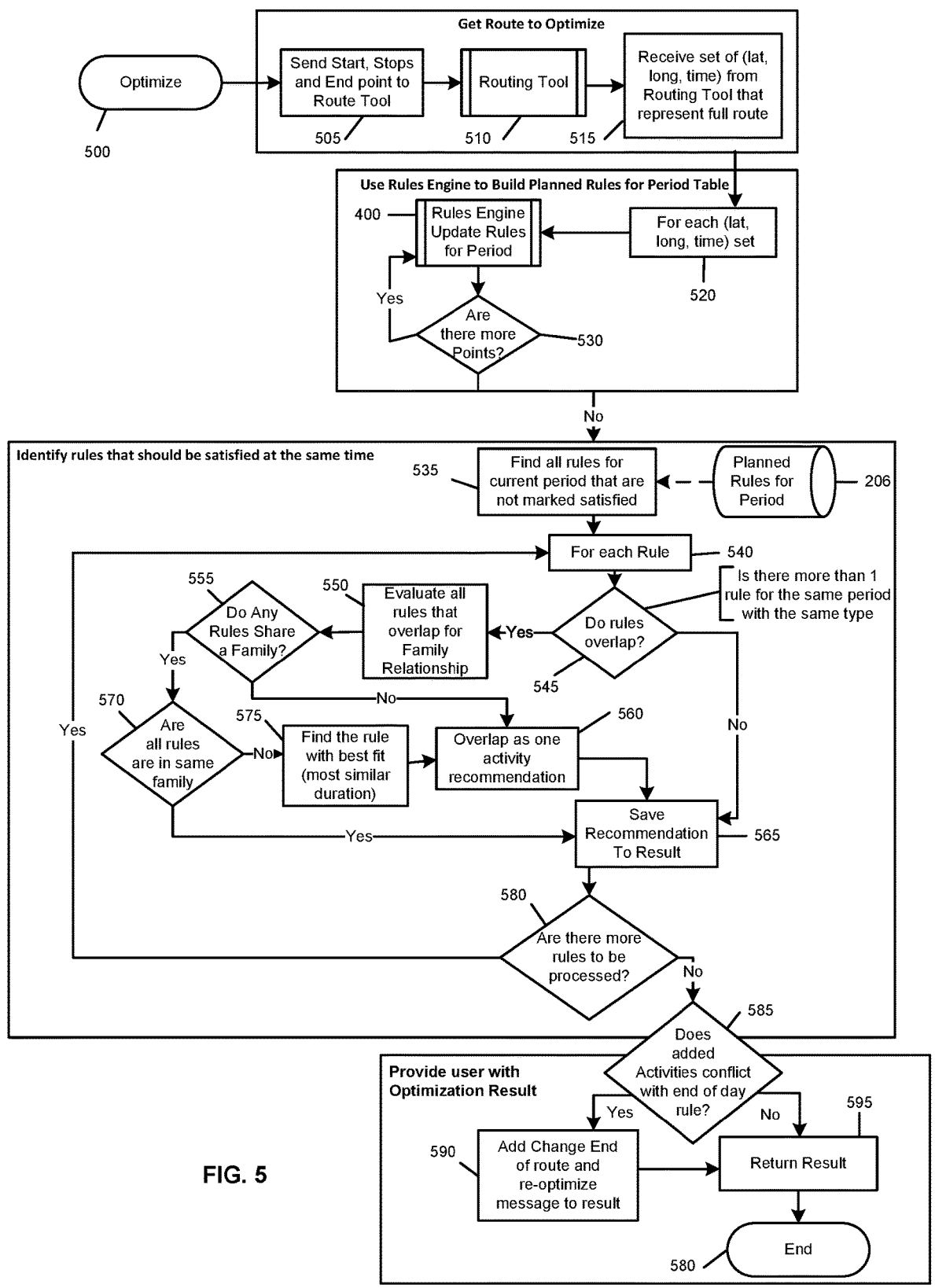
FIG. 5 is a flow chart of an example process for optimization of an individual's workday and breaks, the process performed according to principles of the disclosure.

FIG. 5 is a flow chart of an example process for route optimization, the process performed according to principles of the disclosure. The entry point to the process begins at 500, which may be a callable function accepting the following as input parameters: current user, such as an individual associated with a mobile unit 105a-105c, a start location and a time including any anticipated stop or stops with location and estimated duration, and an end location. At step 505, the start, stop and end locations may be provided to a routing tool 260. At step 510, the routing tool 260 determines at least one route. At step 515, the routing tool 260 provides a set of latitude, longitude and time as results that represent the determined route. The route typically is represented by a large set of latitude, longitude, date/time. These points represent every predestined distance, e.g., 5 miles, but is configurable, of the route.

At step 520, a first latitude and longitude set is identified to be used by the Rules Engine 240 to initiate building a planned route. At step 525, the rules engine is called to update rules for the period 400 for the input parameters. At step 530, a check is made to determine if there are more points of latitude and longitude, and if so, the rule engine is called again at step 525 with the next latitude and longitude set to continue updating rules for the period 400. The update rules for period marks any existing and new rule as satisfied if they are satisfied by a current activity. If there are no further points of latitude and longitude, then at step 535, all rules for the current period that are not marked satisfied are located. At step 540, the first or next unsatisfied rule is obtained. At step 545, a check is made to see if there is more than one rule of the same type for an overlapping period. If not, then processing continues at step 565. If there is more than one rule of the same type for the overlapping period, then at step 550, an evaluation is done to determine if a family relationship prevents overlap. At step 555, for overlapping rules, a check is made to determine if any share a family. If not, processing continues at step 560. If so, a check is made at step 570 to determine if all rules are in the same family. If yes, the processing continues at step 565. Otherwise, if the rules are not all in the same family, then at step 575, those rules with the best overlap, i.e., longest duration overlap, are identified. At step 560, using the latest start time and location and earliest end time and location of the rules, create a recommendation. At step 565, the recommendation for the rules may be saved as a result. Processing continues with step 580 where a check is made to determine if there are more rules to be processed. If so, then processing continues at step 540, otherwise, at step 585, a check is made to determine whether or not the added at least one activity conflicts with the end of day rule. If not, the result may be returned at step 595. The determination at step 585 may be accomplished by taking the date and time of the last point from step 525 and adding in the duration of the at least one activity to satisfy the rule. If the result occurs later than the end of day rule, raise an error indicating that the end of route is not feasible with current route. At step 590, the end point change recommended with re-optimization message is created as a result. At step 595, the result is returned. If there isn't an issue, just return the result to the user. The process may end or return at step 597.

Optimizer Example

A driver of a vehicle 112a-112c needs to drive from Las Vegas, Nev. to Mountain Pass, Calif. He had driven for 7.5 hours before this new load was assigned to finish his day. The driver just completed his 36 hour re-start before he started this day. He plans to leave at noon as that is when he should complete hooking up to the trailer. Referring to steps 505 to 515, to illustrate an example result from a routing tool, a user may enter:

Start Location: Dean Martin Dr, Las Vegas, Nev.
Start Date Time: 5/1/2016 12:00
<No Stops>
End Location: Clark Mt. Road, Mountain Pass, Calif.

TABLE 1 shows a result expected from the routing tool.

TABLE 1

|   | Latitude   | Longitude   | Date Time          |
|---|------------|-------------|--------------------|
| 1 | 36.0672239 | −115.1891994 | May 1, 2016 12:00 |
| 2 | 36.0110969 | −115.2019974 | May 1, 2016 12:07 |

TABLE 1-continued

|    | Latitude   | Longitude    | Date Time          |
|----|------------|--------------|--------------------|
| 3  | 35.9221474 | −115.2277161 | May 1, 2016 12:13  |
| 4  | 35.8677653 | −115.3300632 | May 1, 2016 12:19  |
| 5  | 35.7471878 | −115.4426557 | May 1, 2016 12:25  |
| 6  | 35.7471878 | −115.4426557 | May 1, 2016 12:31  |
| 7  | 35.7200864 | −115.4323792 | May 1, 2016 12:37  |
| 8  | 35.6367557 | −115.5134218 | May 1, 2016 12:43  |
| 9  | 35.6367557 | −115.5134218 | May 1, 2016 12:49  |
| 10 | 35.4407923 | −115.5639171 | May 1, 2016 12:55  |
| 11 | 35.4407923 | −115.5639171 | May 1, 2016 13:01  |
| 12 | 35.4786224 | −115.5426342 | May 1, 2016 13:07  |

Referring to steps 520, 400, 530, to illustrate Update Rules for Period based on the route in the previous step.

Rules before a First Call is shown in TABLE 2:

TABLE 2

| Rule | Rule Type | Satisfied | Valid Period Start | Valid Period End | Rule Family | Value |
|------|-----------|-----------|--------------------|------------------|-------------|-------|
| 8 hr workday no break | Workday | No | May 1, 2016 04:30 | May 1, 2016 12:30 | HOS | 480 |
| 70 hr in 8 days | Workday | No | May 1, 2016 04:30 | May 9, 2016 4:30 | HOS | 4200 |

Using the results from TABLE 1, calling Rules for Period in the Rules Engine 240 for each row shows that Call 1-Call 5 results in no change because the driver did not change regions, so no new rules for time, shown in TABLE 3.

TABLE 3

| Rule | Rule Type | Satisfied | Valid Period Start | Valid Period End | Rule Family | Value |
|------|-----------|-----------|--------------------|------------------|-------------|-------|
| 8 hr workday no break | Workday | No | May 1, 2016 04:30 | May 1, 2016 12:30 | HOS | 480 |
| 70 hr in 8 days | Workday | No | May 1, 2016 04:30 | May 9, 2016 4:30 | HOS | 4200 |

But for Call 6: the driver is working more than 8 hours (since he has already worked 7.5 hours). So now, add the 14-hour workday with break rule.

This rule has the parent of 8-hour workday so it supersedes the 8-hour rule. 8-hours will be removed (shown by strikethrough) and 14-hours will be added as shown in TABLE 4 in the third row.

This rule requires the driver take a 30 min break. So that rule gets added too, as shown in the last row of TABLE 4.

TABLE 4

| Rule | Rule Type | Satisfied | Valid Period Start | Valid Period End | Rule Family | Value |
|------|-----------|-----------|--------------------|------------------|-------------|-------|
| ~~8 hr workday no break~~ | ~~Workday~~ | ~~No~~ | ~~May 1, 2006 04:30~~ | ~~May 1, 2006 12:30~~ | ~~HOS~~ | ~~480~~ |
| 70 hr in 8 days | Workday | No | May 1, 2016 04:30 | May 9, 2016 4:30 | HOS | 4200 |
| 14 hr workday with break | Workday | No | May 1, 2016 04:30 | May 1, 2016 18:30 | HOS | 840 |
| 30 min Hours of Service Break | Break | No | May 1, 2016 07:30 | May 1, 2016 15:30 | HOS | 30 |

Calls 7 and 8 result in no change because the driver did not change regions; therefore no new rules for time, as shown in TABLE 5.

TABLE 5

| Rule | Rule Type | Satisfied | Valid Period Start | Valid Period End | Rule Family | Value |
|---|---|---|---|---|---|---|
| 70 hr in 8 days | Workday | No | May 1, 2016 04:30 | May 9, 2016 4:30 | HOS | 4200 |
| 14 hr workday with break | Workday | No | May 1, 2016 04:30 | May 1, 2016 18:30 | HOS | 840 |
| 30 min Hours of Service Break | Break | No | May 1, 2016 07:30 | May 1, 2016 15:30 | HOS | 30 |

However, for Call 9, the route just added the California region by crossing the state line. Therefore, California break rules now need to be added, as shown in the last three rows of TABLE 6.

TABLE 6

| Rule | Rule Type | Satisfied | Valid Period Start | Valid Period End | Rule Family | Value |
|---|---|---|---|---|---|---|
| 70 hr in 8 days | Workday | No | May 1, 2016 04:30 | May 9, 2016 4:30 | HOS | 4200 |
| 14 hr workday with break | Workday | No | May 1, 2016 04:30 | May 1, 2016 18:30 | HOS | 840 |
| 30 min Hours of Service Break | Break | No | May 1, 2016 07:30 | May 1, 2016 15:30 | HOS | 30 |
| 10 min Break 1 | Break | No | May 1, 2016 06:30 | May 1, 2016 14:30 | CA Breaks | 10 |
| 10 min Break 2 | Break | No | May 1, 2016 10:30 | May 1, 2016 18:00 | CA Breaks | 10 |
| 30 min Lunch Break | Break | No | May 1, 2016 08:30 | May 1, 2016 12:30 | CA Breaks | 30 |

Calls 10-12 result in no change because the driver did not change regions; therefore no new rules for time, as shown in TABLE 7.

TABLE 7

| Rule | Rule Type | Satisfied | Valid Period Start | Valid Period End | Rule Family | Value |
|---|---|---|---|---|---|---|
| 70 hr in 8 days | Workday | No | May 1, 2016 04:30 | May 9, 2016 4:30 | HOS | 4200 |
| 14 hr workday with break | Workday | No | May 1, 2016 04:30 | May 1, 2016 18:30 | HOS | 840 |
| 30 min Hours of Service Break | Break | No | May 1, 2016 07:30 | May 1, 2016 15:30 | HOS | 30 |
| 10 min Break 1 | Break | No | May 1, 2016 06:30 | May 1, 2016 14:30 | CA Breaks | 10 |
| 10 min Break 2 | Break | No | May 1, 2016 10:30 | May 1, 2016 18:00 | CA Breaks | 10 |
| 30 min Lunch Break | Break | No | May 1, 2016 08:30 | May 1, 2016 12:30 | CA Breaks | 30 |

To illustrate an overlap example (steps 535-580), using TABLE 7 as a final ruleset for optimization, the first rule and second rule are used to begin as shown in TABLE 8.

TABLE 8

| Rule | Rule Type | Satisfied | Valid Period Start | Valid Period End | Rule Family | Value |
|---|---|---|---|---|---|---|
| 70 hr in 8 days | Workday | No | May 1, 2016 04:30 | May 9, 2016 4:30 | HOS | 4200 |
| 14 hr workday with break | Workday | No | May 1, 2016 04:30 | May 1, 2016 18:30 | HOS | 840 |

Since these rules are of the same type (Workday) and they cover the same period, they are evaluated together. Moreover, these rules are in the same family (HOS). Both rules are in the same family, so they can't overlap. Therefore, the 14 hour workday with break may be put back on the primary table. Add to that the recommendation (step 565) that the driver has 61 hours and 3 minutes left to work in 8 days or before a 36-hour restart. Notice the 70 hours in 8 days (see TABLE 8) is gone, as shown in TABLE 9.

TABLE 9

| Rule | Rule Type | Satisfied | Valid Period Start | Valid Period End | Rule Family | Value |
|---|---|---|---|---|---|---|
| 14 hr workday with break | Workday | No | May 1, 2016 04:30 | May 1, 2016 18:30 | HOS | 840 |
| 30 min Hours of Service Break | Break | No | May 1, 2016 07:30 | May 1, 2016 15:30 | | 30 |
| 10 min Break 1 | Break | No | May 1, 2016 06:30 | May 1, 2016 14:30 | CA Breaks | 10 |
| 10 min Break 2 | Break | No | May 1, 2016 10:30 | May 1, 2016 18:00 | CA Breaks | 10 |
| 30 min Lunch Break | Break | No | May 1, 2016 08:30 | May 1, 2016 12:30 | CA Breaks | 30 |

To review for Overlap, we would start with the next rule shown in TABLE 10.

TABLE 10

| Rule | Rule Type | Satisfied | Valid Period Start | Valid Period End | Rule Family | Value |
|---|---|---|---|---|---|---|
| 14 hr workday with break | Workday | No | May 1, 2016 04:30 | May 1, 2016 18:30 | HOS | 840 |

There is no overlap as this is the only Workday rule. A recommendation (step 565) may be added that the driver ends the workday at 18:30. Both of the Workday rules are now complete so they are no longer on the table, as shown in TABLE 11.

TABLE 11

| Rule | Rule Type | Satisfied | Valid Period Start | Valid Period End | Rule Family | Value |
|---|---|---|---|---|---|---|
| 30 min Hours of Service Break | Break | No | May 1, 2016 07:30 | May 1, 2016 15:30 | | 30 |
| 10 min Break 1 | Break | No | May 1, 2016 06:30 | May 1, 2016 14:30 | CA Breaks | 10 |
| 10 min Break 2 | Break | No | May 1, 2016 10:30 | May 1, 2016 18:00 | CA Breaks | 10 |
| 30 min Lunch Break | Break | No | May 1, 2016 08:30 | May 1, 2016 12:30 | CA Breaks | 30 |

To review for overlap (step 545), begin with the first rule and moving forward, referring to TABLE 11. Since these break rules are of the same type (Break) and they cover the same period they are evaluated together. Some of the rules are in the same Family (CA Breaks) (step 555). Since not all rules are in the same family, identify which rules from the family fit best. This may be done using the duration (step 575). Because both the "30 min Hours of Service Break" and the "30 min Lunch Break" are 30 minutes, the tool recommends overlapping these (step 560). Overlap rules may find rules with the highest minutes of overlap in a case where it is not as clear cut as being the same. A recommendation may be added that the driver take a 30 min break between now and 12:30 (step 565).

Both of the 30 minute breaks were taken care of last pass so they are no longer on the table, as shown in TABLE 12.

TABLE 12

| Rule | Rule Type | Satisfied | Valid Period Start | Valid Period End | Rule Family | Value |
|---|---|---|---|---|---|---|
| 10 min Break 1 | Break | No | May 1, 2016 06:30 | May 1, 2016 14:30 | CA Breaks | 10 |
| 10 min Break 2 | Break | No | May 1, 2016 10:30 | May 1, 2016 18:00 | CA Breaks | 10 |

To review again for Overlap, begin with the first two rules, as shown in TABLE 12. These rules are of the same type (Break) and they cover the same period so they may be evaluated together. The rules are in the same Family (CA Breaks) (step 555). Both rules are in the same family, so they can't overlap (step 570). Add a recommendation that the driver has to take a 10 min break between now and 14:30 (step 565).

Since both of the 30 minute breaks were taken care of last pass they are no longer on the table, as shown in TABLE 13.

TABLE 13

| Rule | Rule Type | Satisfied | Valid Period Start | Valid Period End | Rule Family | Value |
|---|---|---|---|---|---|---|
| 10 min Break 2 | Break | No | May 1, 2016 10:30 | May 1, 2016 18:00 | CA Breaks | 10 |

To review Overlap (step 545), we would start with the next rule, as shown in TABLE 13.

There is no overlap as this is the last rule on the table. Add a recommendation that the driver has to take a 10 min break between now and 18:00.

Based on the above example, the driver could receive five messages:
You have 61 hours and 3 min left to work in 8 days or before a required 36-hour restart.
Your workday must end before 18:30.
You need to take a 30 min break between now and 12:30.
You need to take a 10 min break between now and 14:30.
You need to take a 10 min break between now and 18:00.

The compliance module 252 is an application that works with the rules engine 240 to ensure a user associated with a mobile unit 105a-105c is in compliance with the rules that must be followed based on their geographic position (current and historic). To enable the user to be compliant, the compliance module 252 is configured to provide information about upcoming rules to follow. The compliance module 252 may be configured to provide the user a warning or alert based on a configured time period that they may soon be out of compliance.

Example: workday must end in the next 30 min or will be out of compliance with company policy on overtime.

The compliance module 252 may be configured to notify the end user and have the ability to notify a third party that the user is operating out of compliance.

Example: FMCSA regulation states that a driver must take a 30 min break before starting the $7^{th}$ hour of driving. When the user enters their $7^{th}$ hour, the application will notify them that they are now out of compliance. The driver's leader may receive a notification (e.g., a text, an email, or the like) letting them know that the driver is operating out of compliance.

The compliance module 252 may configure standardized reports for the user to review. For the transportation industry these reports may have specific formatted reports that meet FMCSA ELD Regulations.

Example: A driver will be able to view their FMCSA Log activities for a week in the 5-line log format.

Moreover, a web application may be provided for users to create a custom report to show a user's compliance. Reports also can be created across multiple users.

Example: the leader can pull up a report of all times they were out of compliance in the last 6 months during our semi-annual performance review.

Example: a compliance officer may pull up a report of all users who were not in compliance this week to share with individual leaders to ensure they take corrective action.

The compliance engine uses Update Rules for Period 400 to leverage the rules engine 240. Based on an application configuration, every X mile(s) (default may be 1 mile, but is configurable) the rules builder may read the latitude (Lat), longitude (Long) from the mobile unit 105a-105c GPS 113a-113c. The rules builder may send the Lat, Long to the rules engine 240. The rules engine 240 may determine if there are any changes to a user associated with a mobile device 105a-105c rules for period.

Figure 6A:
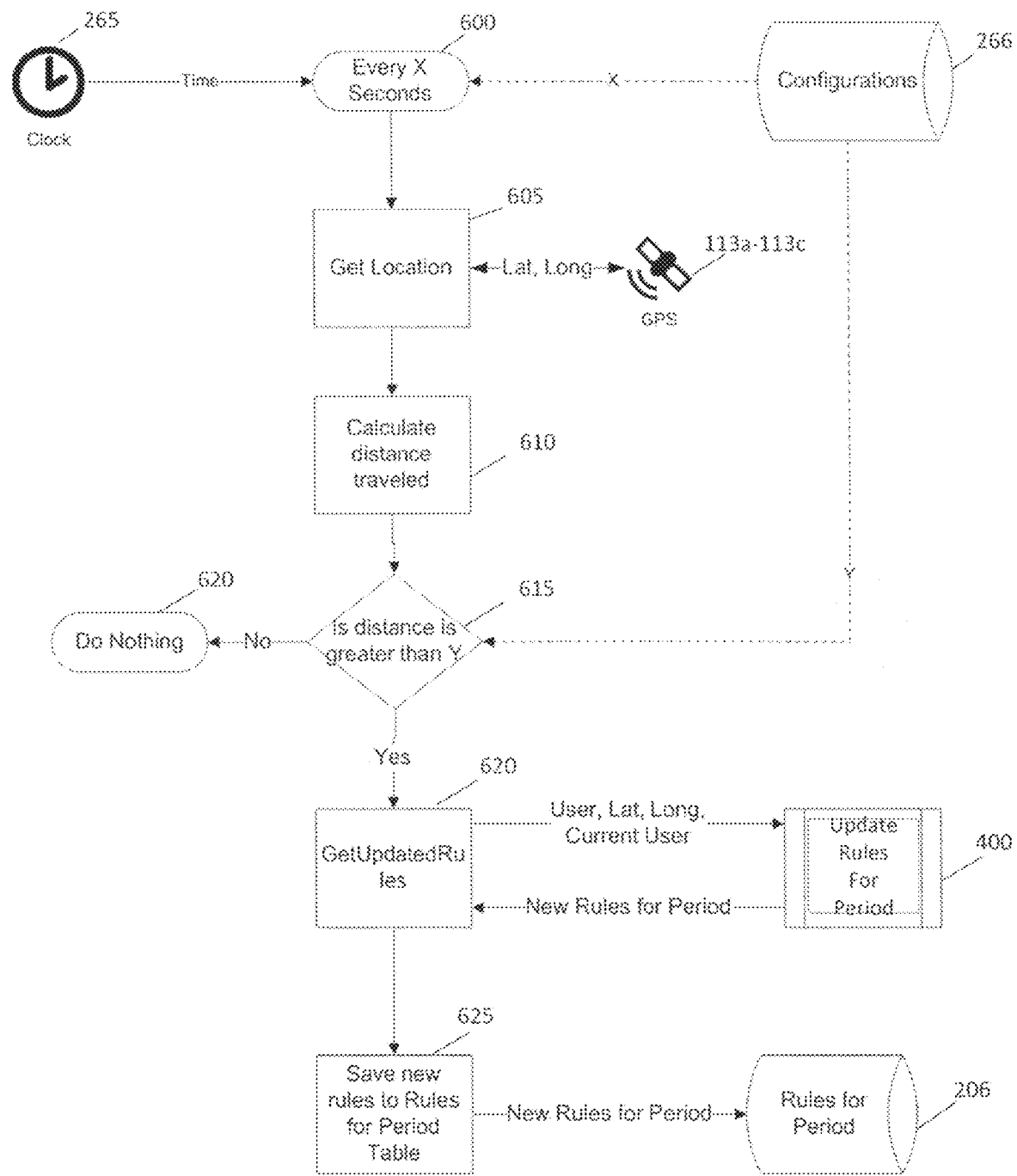
FIG. 6A is a flow diagram showing an example process to determine rules to be monitored for compliance, the process performed according to principles of the disclosure.

FIG. 6A is a flow diagram showing an example of a compliance engine process to maintain the rules that must be complied to, the process performed according to principles of the disclosure. At step 600, by configuration 266 and a programmable timer or clock function 265 is used to initiate how often the compliance module 252 should check the location of a mobile unit 105a-105c. By default, the system 100 may make this call every 30 seconds. The compliance module 252 interacts with the GPS 113a-113c on the mobile unit 105a-105c. Using the last GPS position, and the obtained current position (step 605), calculate distance traveled (step 610). A configurable setting may be used to configure how often the compliance module 252 should check the location of the mobile unit 105a-105c. Because this typically requires a call to the server 115, the more often it runs the more data may be used. By default, the system 100 may make this call every 1 mile, but is configurable. A step 615, a check may be made to determine if the distance from step 610 is greater than the configured distance. If the determined distance is less than the configured distance, exit the function at step 618. Otherwise, at step 620, update rules for period using the rules engine 240 using current user, Lat and Long from step 605. This may return any new rules for the period found based on the new geographic position. At step 625, any new rules are saved to the rules for period database 206.

Figure 6B:
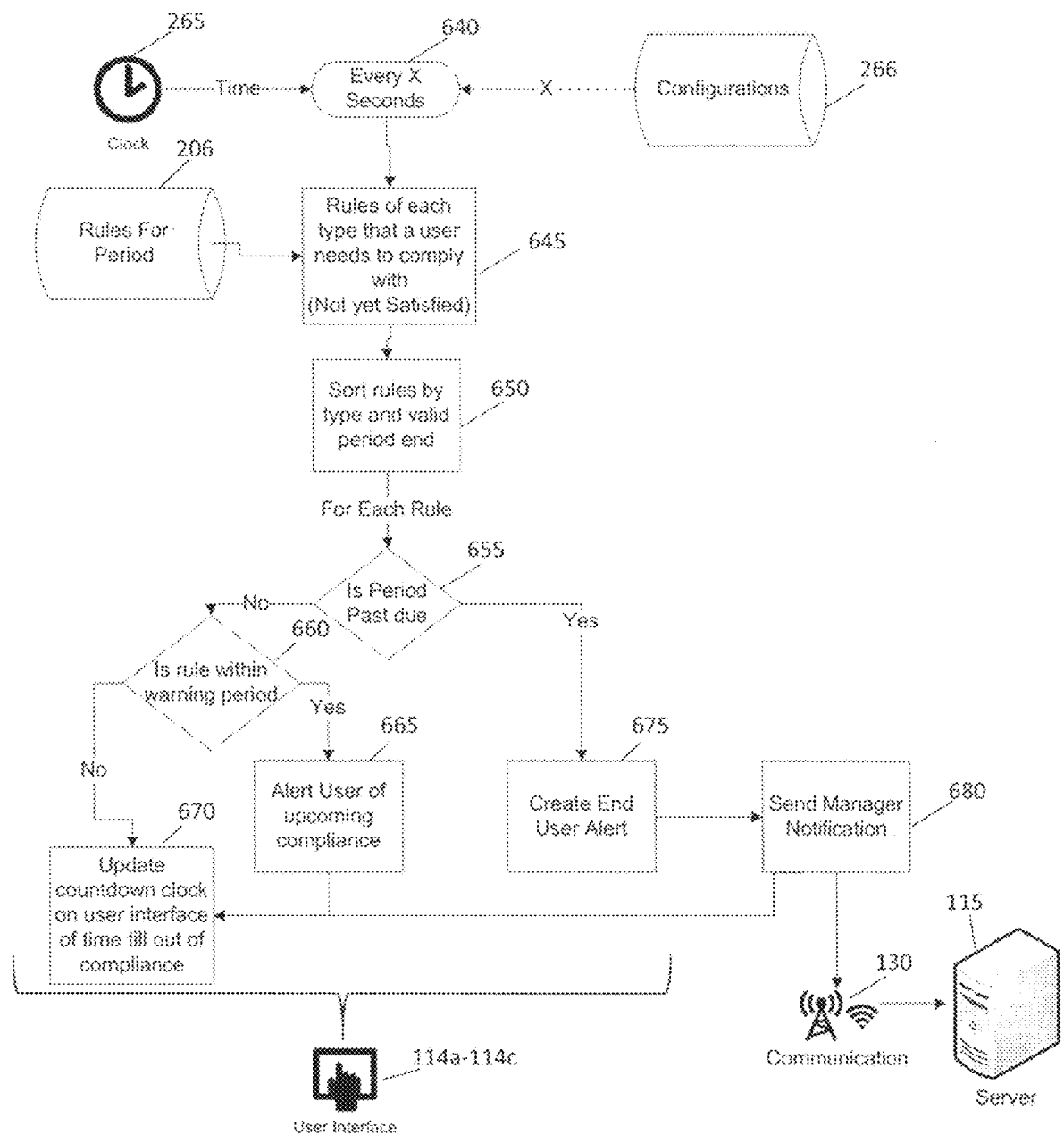
FIG. 6B is a flow diagram showing an example process for rule compliance monitoring and notification, the process performed according to principles of the disclosure.

FIG. 6B is a flow diagram showing an example process for rule monitoring and notification, the process performed according to principles of the disclosure. The process of FIG. 6B may be considered a sub-system for rule monitoring and notification. The sub-system rules monitor and notification of FIG. 6B may leverage the rules for period table of the rules database 206 to determine what rules a user associated with mobile unit 105a-105c must comply. For rules types that directly impact the user's work, the sub-system rules monitor and notification sub-system may provide feedback to the user through the interface 114a-114c. In some cases, the sub-system of FIG. 6B may send notifications to someone other than the end user to alert them of an issue.

By configuration 266, rule monitoring and notification sub-system provides an ability to configure (step 640) how often to validate compliance and provide feedback to the user. By default, the system 100 may make this call every 5 seconds, but is configurable. At step 645, a query for the Rules for Period table may be made. The query only returns rules that have not yet been satisfied by a user activity (as indicated on the rules for period table) and the valid period has started. The query also only focuses on the rule types that a user would need notifications. At step 650, a sort first by type, then by valid period end may be performed. This allows a correct order of processing the rules. At step 655, a loop is created to process all rules. If the current timestamp (data & time) is later than the valid period end data and time, proceed to step 675 where an alert may be created to the user indicating that the event is overdue. Moreover, if the rule has back office communication set to true, at step 680 a message may be sent to the backend server to indicate the user is out of compliance. The server may then notify the interested parties in the manner they indicate (e.g., email, SMS, chat bot, workflow alert, or the like). At step 670, a countdown clock may be initiated or updated at the user interface of time until out of compliance.

If at step 655 the period is not past due, then at step 660 a check is made whether or not the rule is within a warning period. If not, then continue at step 670. If the rule is within a warning period, then at step 665 an alert may be created to warn the user that an activity must occur soon. This alert can include audio and visual information to notify the user that they are not in compliance with the rule. Because of different work configurations (safety could be an issue with some alert types if the user is driving), the notification type is configurable by rule. Using the notification Type Table, an audio file (if one exists) may be played located at the path indicated. The text may be displayed in the notification, and the image may be displayed on the screen, e.g., 114a-114c if an image path is provided. Processing may continue at step 670.

An Activity is the actual record of "What has occurred" over a period of time. And activity may have a start time, end time, start location and end location. Activities may reflect Work Performed (Driving, stuck in Traffic, Loading, Unloading, Waiting, Paperwork, etc) and other items that need to be recorded for regulatory purposes (Workday, Lunch Breaks, Rest Breaks, 36-hour Restart, Sleeper, Off Duty).

Activities reflect a start and end time.
All activities have a duration that they occurred. To determine this duration, the activities may be stamped with a start and end time.
Activities reflect a start and end location Lat and Long to reflect where the activities occurred.
All activities may have a location indicating where they occurred. To determine this the activity may be stamped with a Lat and Long. As some activities occur at a given location, the start and end location may be the same.
Activities can be hierarchal in their structure.
Example: in the trucking industry, a driver must be in a specific hours of service state (e.g., driving, off duty, on duty, sleeping, personal conveyance), these activities could be parents to activities such as loading, unloading or stuck-in-traffic if further detail is needed. The stuck-in-traffic could resolve the need to determine if a driver is earning at least minimum wage every hour if they are paid by the mile.
Activities can be added/configured.
If a company using the system 100 needs to track a new activity in accordance to a rule or as an event for compensation or billing, these can be added using the activity logger.
Activates can be associated to rules. An activity may be associated to more than one rule, and more than one rule may be associated to an activity.
Example: a company could create a break activity; and may associate that activity to the break rule. This could be taken further to create a lunch break activity that could be associated to only some breaks.
Activities may be used to show compliance to rules.
Example: in the trucking industry the set of activities (driving, off duty, on duty, sleeping, personal conveyance) would be created to satisfy FCMSA Hours of Service Logging rules. By recording the time spent in each of these activities, a driver's compliance to these regulations may be demonstrated.
Activities can be used to pay for work performed.
Example: An organization could write extracts of activities and push them to a compensation calculation tool to determine a portion or all of an individual's pay. As an example, if a company needed to pay a driver for time spent in traffic without moving, they could create a "stuck-in-traffic" activity, then extract it and provide it to the compensation calculation tool to pay the driver for that time.
Activities can be used to invoice for work performed.
Example: an organization could write extracts of activities and push them to a billing tool to determine a portion or all of the charges for a customer. As an example if an HVAC specialist spends 2.5 hours cleaning ducts, this recorded activity can be sent to a billing system to generate the labor portion of a customer's invoice.
Specific user inputs of activities/events can be configured. These actions/events may be used to show compliance.
Example: a user may input the start of a workday by pressing a "clock in" button.
A user may be notified of an expected input based on a rule configuration.
Example: 30 min after a user indicates that they are going to take their 30 min break, the user may be prompted to record the time they come off of break.
A portal may allow an individual with proper security to update activities.
Example: an individual left for the day 3 hours ago, and forgot to clock out. The individual called and asked that their manager clock them out at the correct time. This may be permitted based on rule configurations.
Activities that are configured to allow edits can be further configured to have an edit approval process.

Example: a manager updates an individual's time record to reflect the time they left the office at the individual's request, however policy requires the individual to acknowledge that change.

An Event is the actual record of something that happened. A key difference between activities and events is that an event is a specific time, where and activity provides a time and duration. Events are triggered by something external to the system like the connection to the truck. For Example: (Start Driving, Stop Driving, Engine On).

Events may be created on its own based on key factors.
Example: in the trucking example, a rule could be created to create a start driving event when the vehicle starts moving.

Events may have an Event Type which is a reference object that contains information to define events and their behavior.

Events are primarily used to provide a way for external factors to assist in managing activities.
Recording when a truck has started moving based on information found on a controller area network (CAN) bus within the truck, and not the internal GPS. An interface with the truck and the CAN bus may be provided to determine when the truck is moving based on, e.g., the power-take-off (PTO), speedometer, or odometer. These events may be used by the activities application.

An end user may update their activities to reflect actual events. This ability may be configured by rule to ensure compliance with policies and regulations.
Example: a user took a break 4 hours ago and forgot to log it, they may need to update their activities to indicate the break was taken.
Example: a driver does not agree with the system's 100 recording driving activity, and wants to update the record to reflect driving starting 30 min later, however the rule has been configured to not allow an end user to update this event to prevent log falsification.

An Activity Type is reference object that contains information to define activities and their behavior.

The activity type configurator 250 is a tool that may allow a user to create, update and remove activity types. Users may tie activities to the rules that they satisfy. The activities can also be configured to automatically be created based on time, location or event, or based on the same factors, a prompt to the user to log then may be issued. The activities configurator 250 may leverage external tools to create the user interface for prompts. As the back office works to create the configurations, the configurations may be synced on a periodic basis to the end user's devices 110a-110c. The period of this integration can be set by the back office though configuration.

Figure 7:
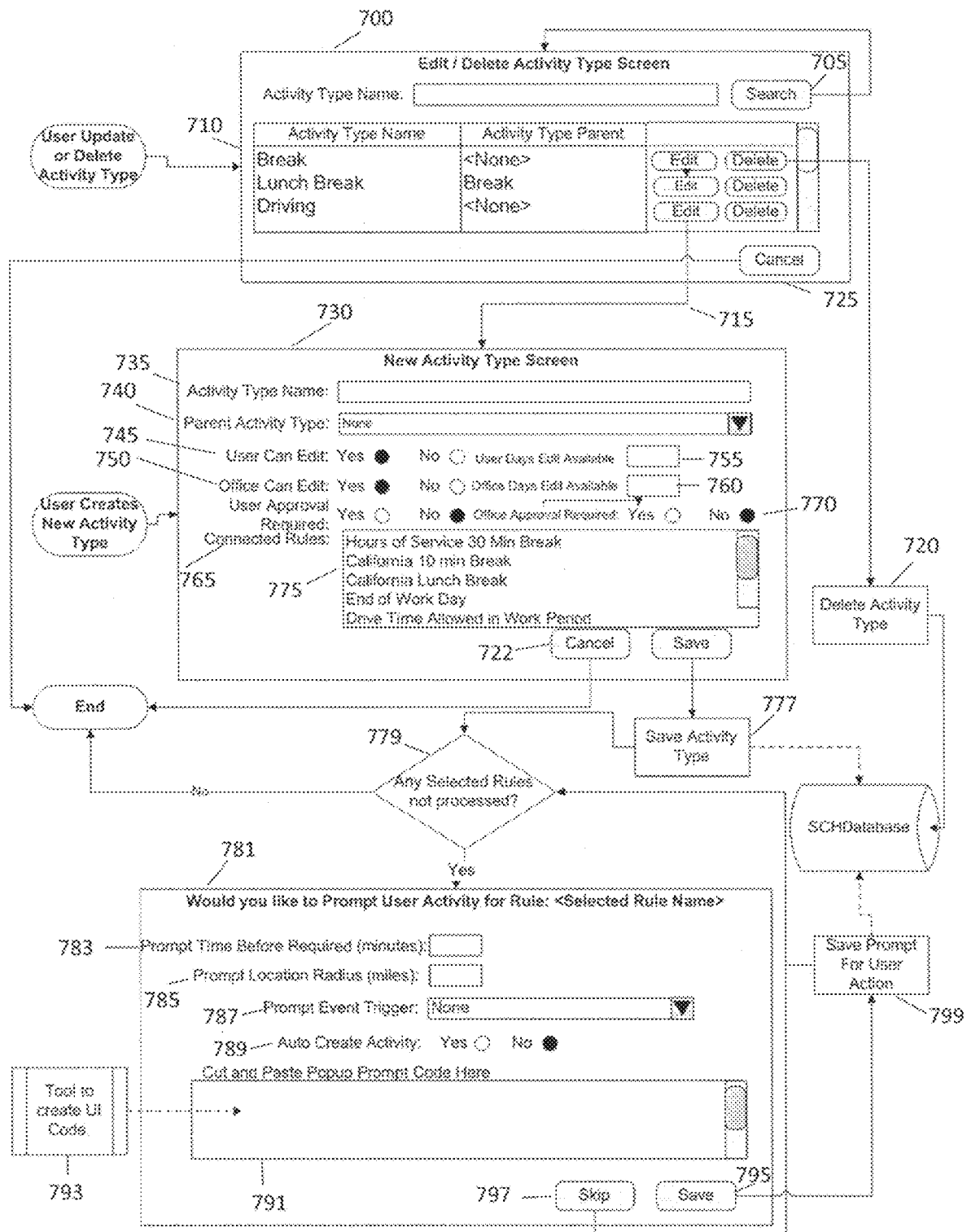
FIG. 7 is an example interface to describe an activity configurator functionality, configured according to principles of the disclosure.

FIG. 7 is an example interface to describe an activity type configurator functionality, configured according to principles of the disclosure. The activity type configurator may include:

700—Edit/Delete Activity Type Screen may be used to search for activity types. The user can select an activity to edit or delete. The layout of this screen should include any data about the activity that the user may want to have.

705—Search Field(s) & Search Button, Create the ability for a user to search for activities. Name or parent are the most likely search fields, by joining activity type to rules, a search on activities associated to specific rules can be performed.

710—An edit feature. Clicking Edit may bring up the activity detail in a screen that allows the user to edit the activity type record.

715—A delete feature. Clicking Delete removes the record from the database

725—A cancel feature. Clicking Cancel may take the user back to the main screen.

730—The "New Activity Type" Screen shows the key information needed to make activities work.

735—The "Activity Type Name" is the name of the activity type. Note that this may be the name of all instances (activities) that a user creates. The name is what is displayed to users, so it should be named appropriately. Duplicates should be avoided when creating names as this may create confusion for users.

740—"Parent Activity Type" is an activity that this activity inherits the rules it will satisfy from. If this activity will not satisfy all rules that the parent will, don't use Parent. Parent may often be left blank <None>.

745—"User Can Edit" is a flag that indicates that an end user can make changes to activities of this type after the fact.

750—"Office Can Edit" is a flag that indicates that a back office user (example: manager) can edit activities of this type.

755—"User Days Edit Available" is the number of days after the activity is created that the end user may be able to edit activities of this type.

760—"Office Days Edit Available" is the number of days after the activity is created that a back office user (example: manager) may be able to edit activities of this type.

765—"User Approval Required" is a flag that indicates that an end user must review and approve any changes made by a back office user.

770—"Office Approval Required" is a flag that indicates that a back office user must review and approve any changes made by an end user.

775—"Connected Rules" indicates all rules that the activity may satisfy. If activities are created for a reason other than rules, like to record work that was done, they should not be tied to a rule. An example of how this would be used is if an activity named "Break" is created, it may be attached to the Hours of Service 30 minute break rule, California 10 minute Break rule and California lunch break rule. All activities of this type could then be used to satisfy those rules provided they are for the correct duration.

777—When the user clicks the "Save" button, either a new activity is created, or update an existing activity, depending on how the user came to the page.

779—The next set of information may be created for each Activity Type, Rule combination. When all are processed, the application may return to the main page.

781—An activity prompt is a feature that can permits the configuration of an end user prompt, or the automated creation of and. By adding prompts to an activity, it works with the overall activity configurator and displays a popup covering most of the screen.

783—"Prompt Time Before Required (minutes)" is the number of minutes before an activity is due to be done that the application creates a popup to the user or auto generates an activity.

785—"Prompt Location Radius (miles)" is the radius of a circle around a specific geocode (latitude/longitude) that when that radius is crossed, a popup to the user may be created or auto generates an activity 787—"Prompt Event Trigger" is a list of triggers that can be used to trigger, a popup to the user may be created or auto generates an activity. For the trucking industry, the connection to the truck is leveraged to bring in events such as, e.g., wheels in motion.

789—"Auto Create Activity" is a flag that, if yes, indicates that when the time, location or event occurs, an activity is auto created for the user.

791—"Cut and Paste Prompt Code Here" is a text box in which the user may paste all code for a popup. This may be injected into the main page when the event occurs. This feature permits tailoring to the end user's experience.

793—Any HTML/Javascript tool can be used to create the code so long as it permits the user to cut and paste it into the text box of 791.

795—Save the current record.

797—Skip this record. No prompts are needed for this rule/activity type combo.

The activity logger 220 and editor 215 encompasses the tools which create activities, including start and finish times in which to measure compliance against. As these activities are configured to show breaks taken as well as specific work performed, they can also be used to feed compensation and billing systems to ensure accurate pay or invoicing for work.

Figure 8A:
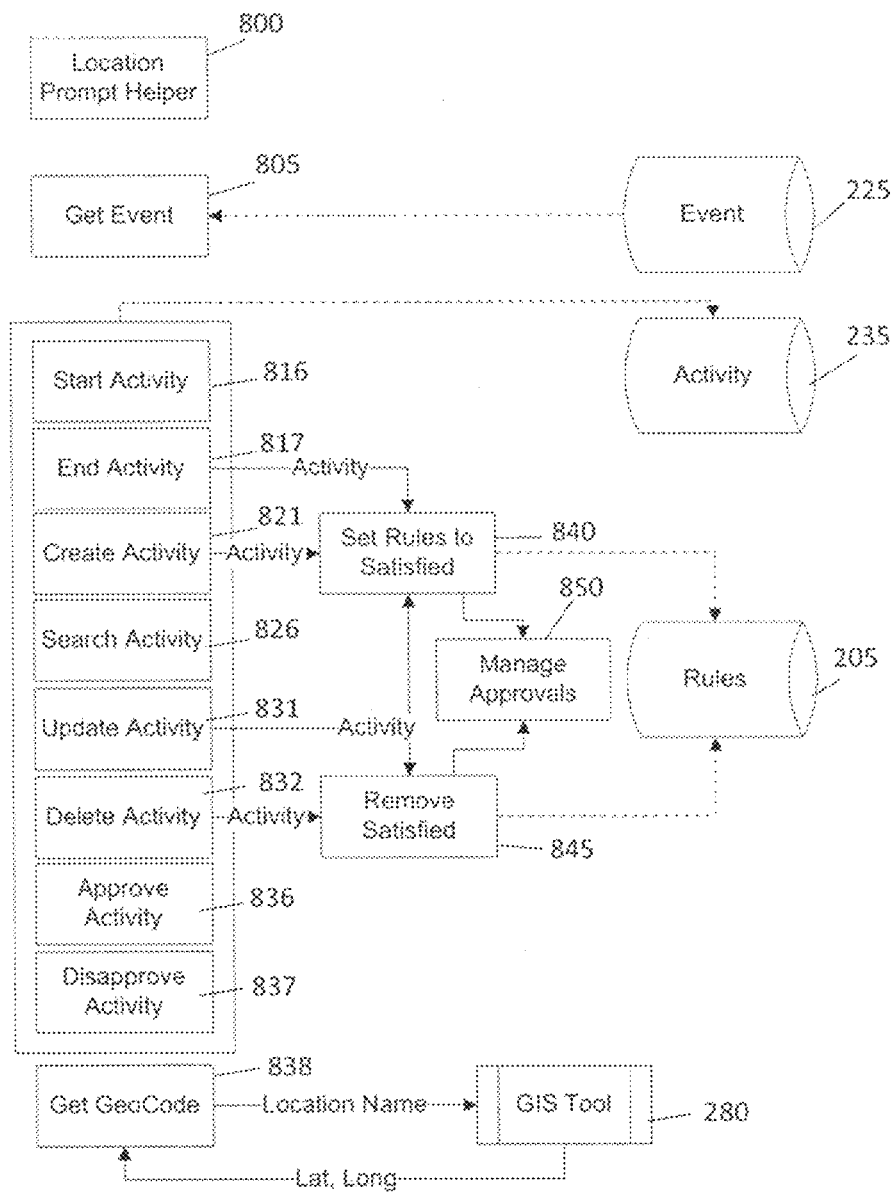
FIG. 8A is an illustration showing an example of functions provided in the activity logger application program interface (API) and how they interact with each other. The ovals are included to provide example context on how these functions would be used, according to principles of the disclosure.

The Activity Logger 220 is a tool that may be used by a user associated with a mobile unit 105a-105c to log activities. The activity logger 220 is primarily an API (Application Program Interface) that may be accessed by prompts. FIG. 8A is an illustration of functional block diagram of an activity logger, configured according to principles.

In FIG. 8A, the functions include:

821—Create Activity (see FIG. 8B for example flow diagram)
 a. This provides the ability to create an activity. This method may be used to create activities that are already complete.
 b. If the log the activity is being created for does not permit overlap, this method prevents the user from creating overlapping activities.
 c. As the activity is now created, Call Set Rules to Satisfied 816—Start Activity (see FIG. 8C for example flow diagram)
 a. This may create an incomplete activity and mark the Current flag to True. Only one activity per Log can have current flag set to True. If Start Activity is called and there is a current activity, the application may return an error that may be handled by the UI. Most common may be a question "Do you want to complete your previous activity?" However, based on the activity, each situation can be scripted by the developer of the UI to provide the best user experience.
 b. If the log the activity is being created for does not permit overlap, this method may throw an error that a future activity has been recorded and must be changed before this activity can be started.
 c. This method may Create an activity using the current information. It may require a Log and activity type to be passed in.
 d. It may set Start Time to the current timestamp
 e. It may set the Start Lat and Long to the current GPS location (provided the GPS is providing an accurate position. Otherwise, it may wait for an accurate location or request one from the user)

817—End Activity (see FIG. 8D for an example flow diagram)
 a. This method may complete the current activity by setting the End time to current and End Lat and Long to the current GPS location (provided the GPS is providing an accurate position. Otherwise, it may wait for an accurate location or request one from the user).
 b. It may set the current flag to False
 c. As the activity is now created, Call Set Rules to Satisfied 826—Search Activity (see FIG. 8E for an example flow diagram)
 a. This is a method that may find all Activities that match a set of parameters provided by the user. The result may be returned as complete Activity Objects.
 b. Search Activity may also be callable as a web service from other applications. This is expected to be used to pass activities that are compensable and/or billable activities as a part of the users work process to external systems.

831—Update Activity (see FIG. 8F for an example flow diagram)
 a. This method may update the activity
 b. If the log the activity is being created for does not permit overlap, this method may prevent the user from creating overlapping activities.
 c. After the update, Call Remove Satisfied and Set Rules to Satisfied.

832—Delete Activity (see FIG. 8G for an example flow diagram)
 a. This method may Delete the activity
 b. Call Remove Satisfied 840—Set Rules to Satisfied(Activity) (see FIG. 8H for an example flow diagram)
 a. This method may find and update all rules that are satisfied by a new or updated activity.

845—Remove Satisfied (Activity) (see FIG. 8I for an example flow diagram)
 a. This rule may identify any rules that need to have the satisfied flag removed. After the flag is removed, on an update, the application may attempt to rematch rules.

850—Manage Approvals (see FIG. 8J for an example flow diagram)
 a. Identify who needs to be notified
 b. Notify the correct users based on their desired method
  i. Email
  ii. SMS
  iii. Activity Popup Prompt (see Activity Configurator #24) [May create event]
  iv. Web Client Application (Your notifications) [See Activity Editor]

805—Get Event (see FIG. 8K for an example flow diagram)
 a. Get event is a function that leverages the event functionality. It is a query to the Event Table to identify if a specific event occurred.

836—Approve Activity (List of Activities) (see FIG. 8L for an example flow diagram)
 a. This may allow a user to approve one or more activities. It may accept a list of activities to provide the developers of interfaces the ability to have an "Approve All" feature.

Figure 8B:
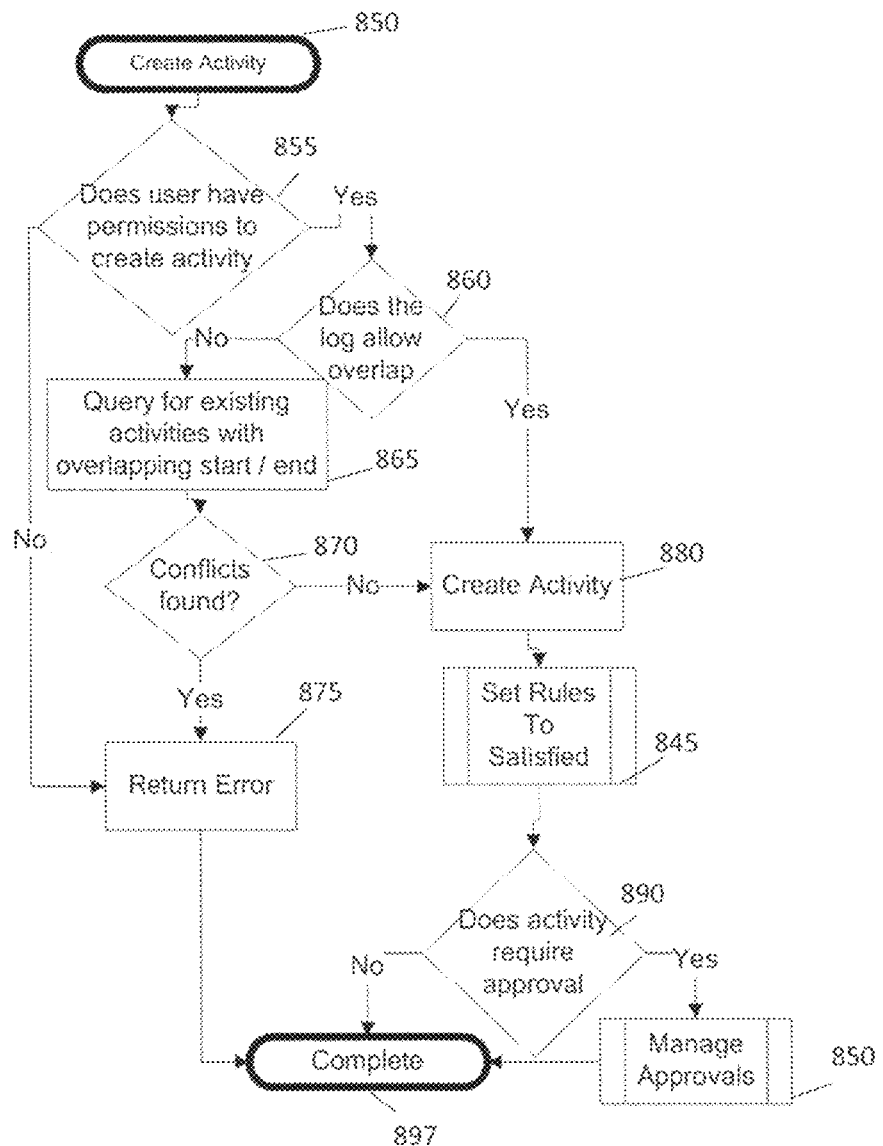
FIG. 8B is a flow diagram showing an example process for a create activity function, performed according to principles of the disclosure.
Figure 8C:
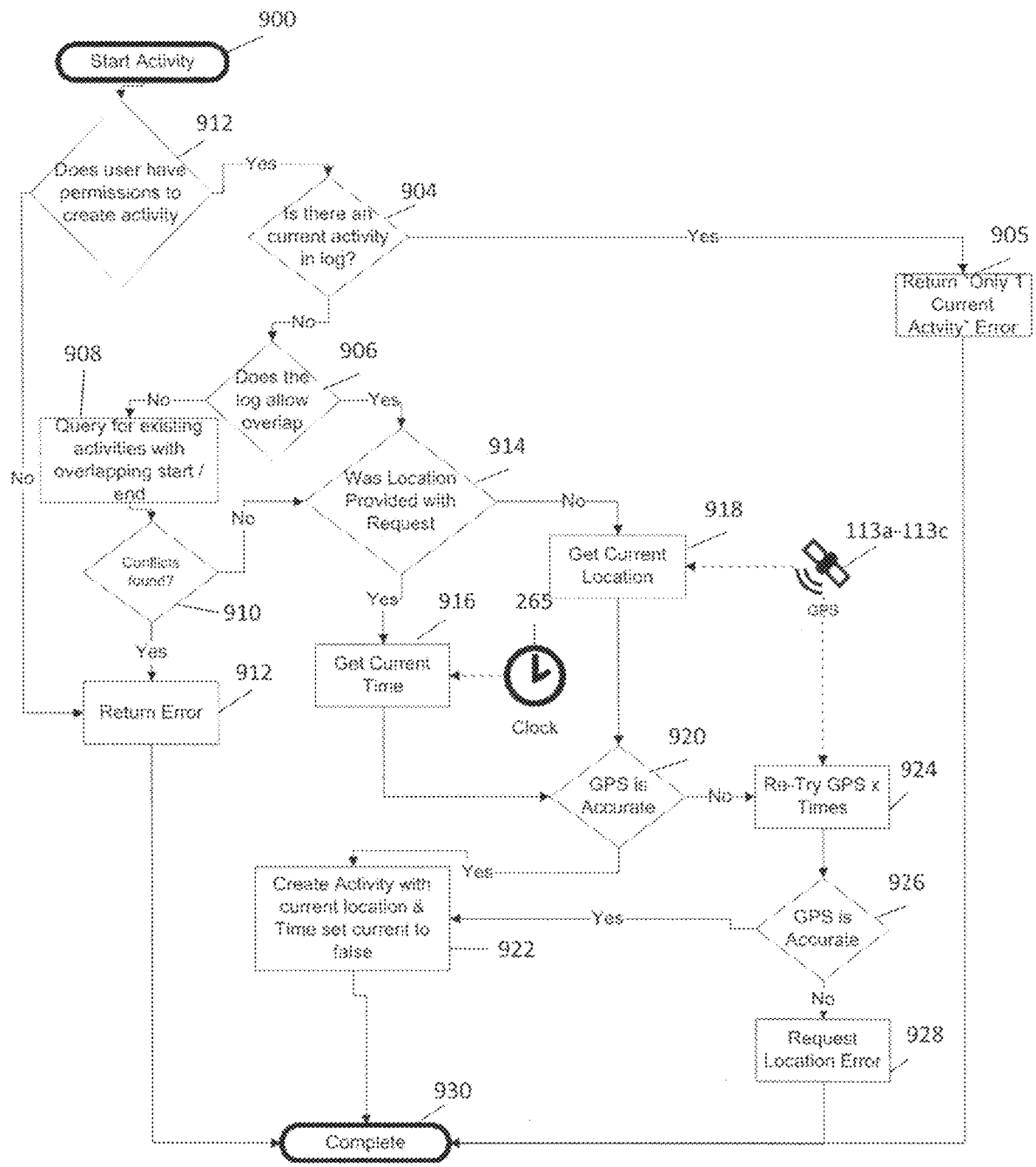
FIG. 8C is a flow diagram showing an example process for a start activity function, performed according to principles of the disclosure.
Figure 8D:
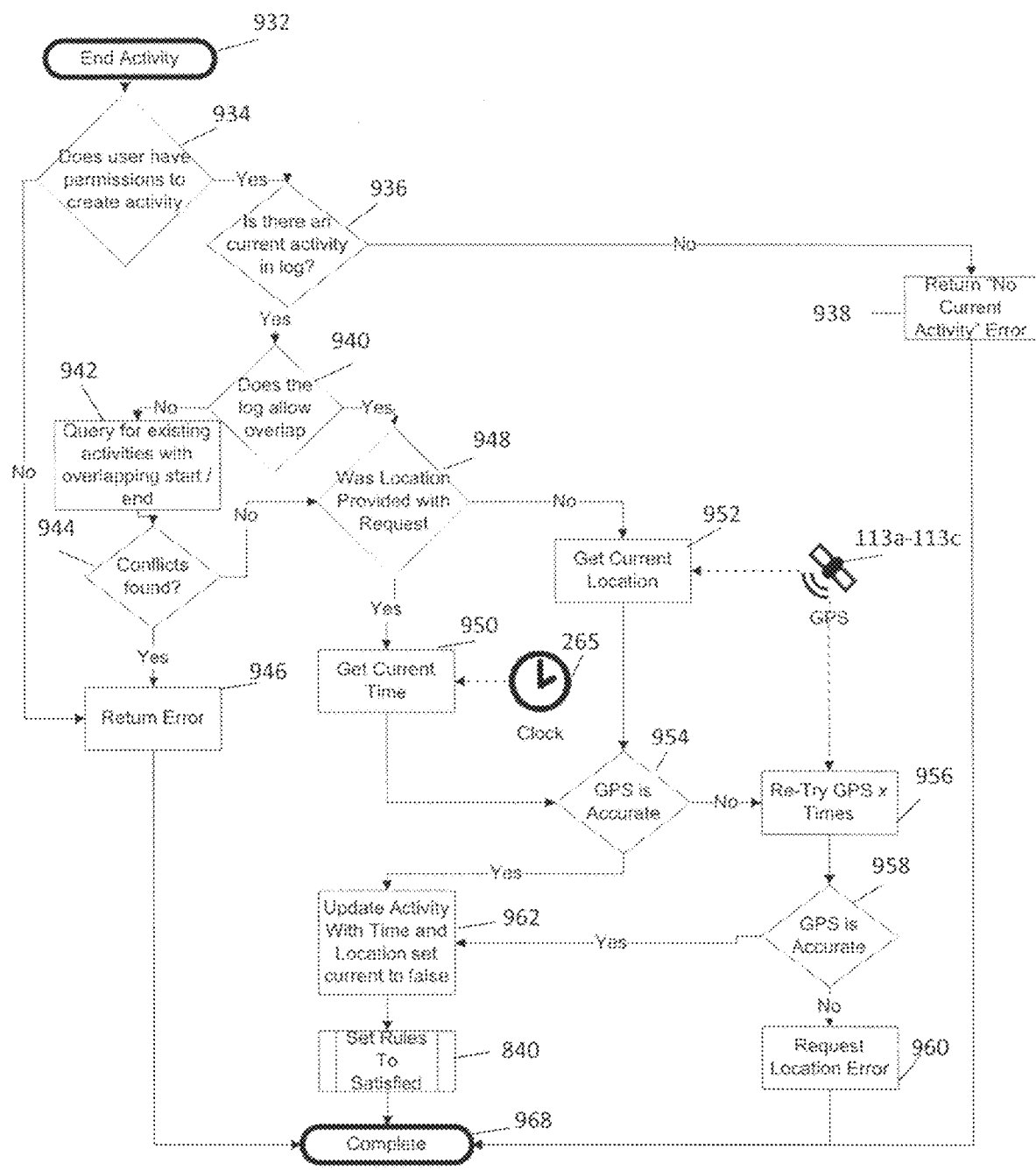
FIG. 8D is a flow diagram showing an example process for an end activity function, performed according to principles of the disclosure.
Figure 8E:
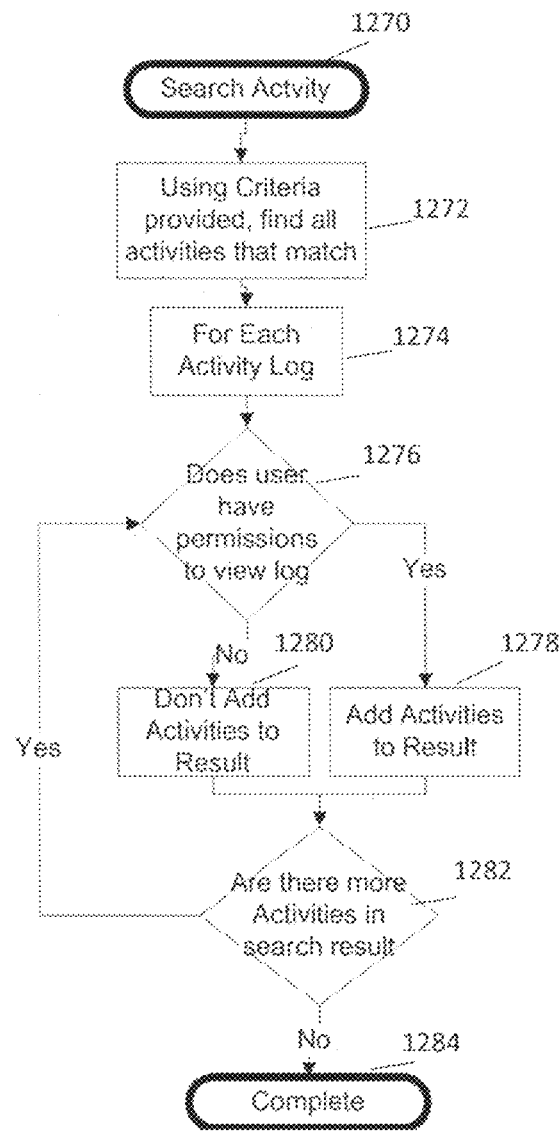
FIG. 8E is a flow diagram showing an example process for a search activity function, performed according to principles of the disclosure.
Figure 8F:
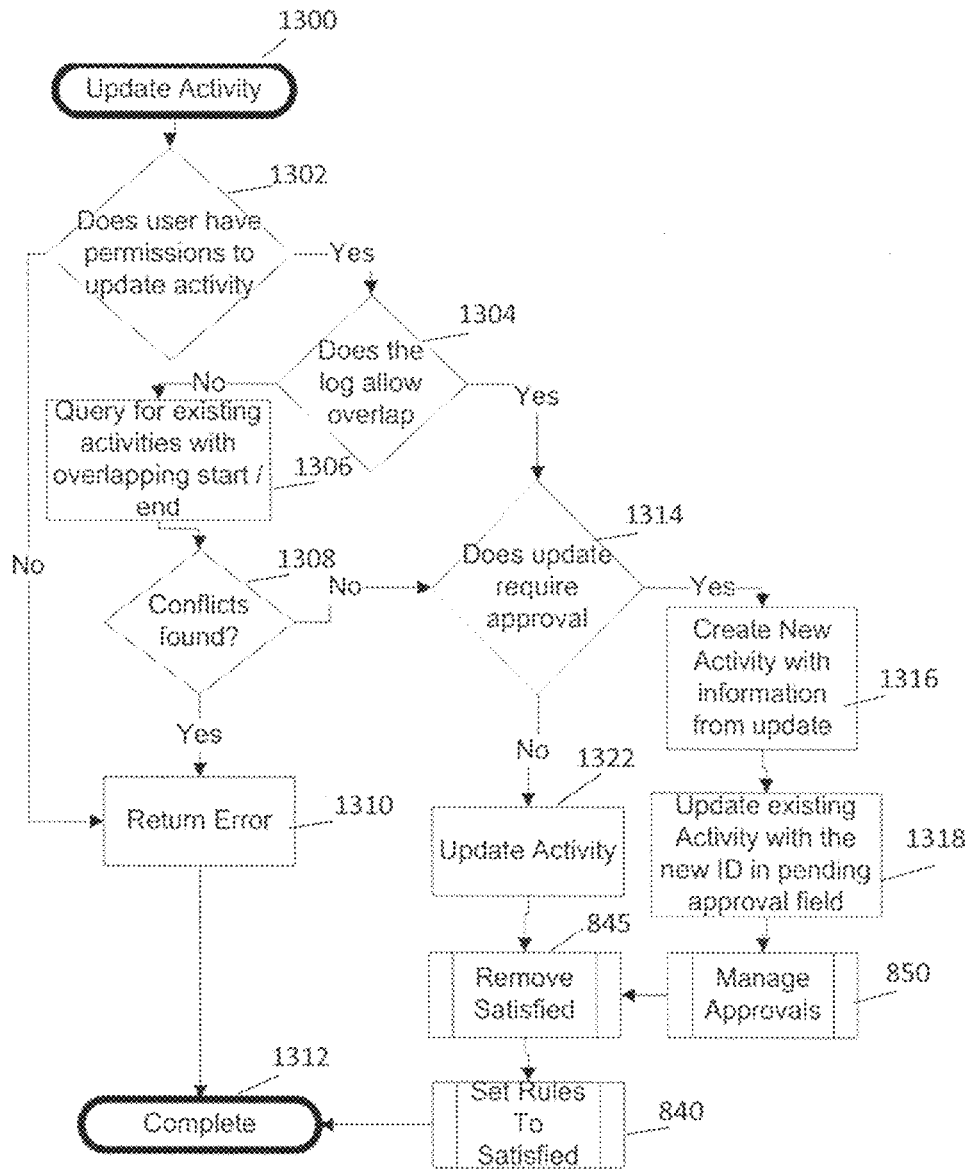
FIG. 8F is a flow diagram showing an example process for an update activity function, performed according to principles of the disclosure.
Figure 8G:
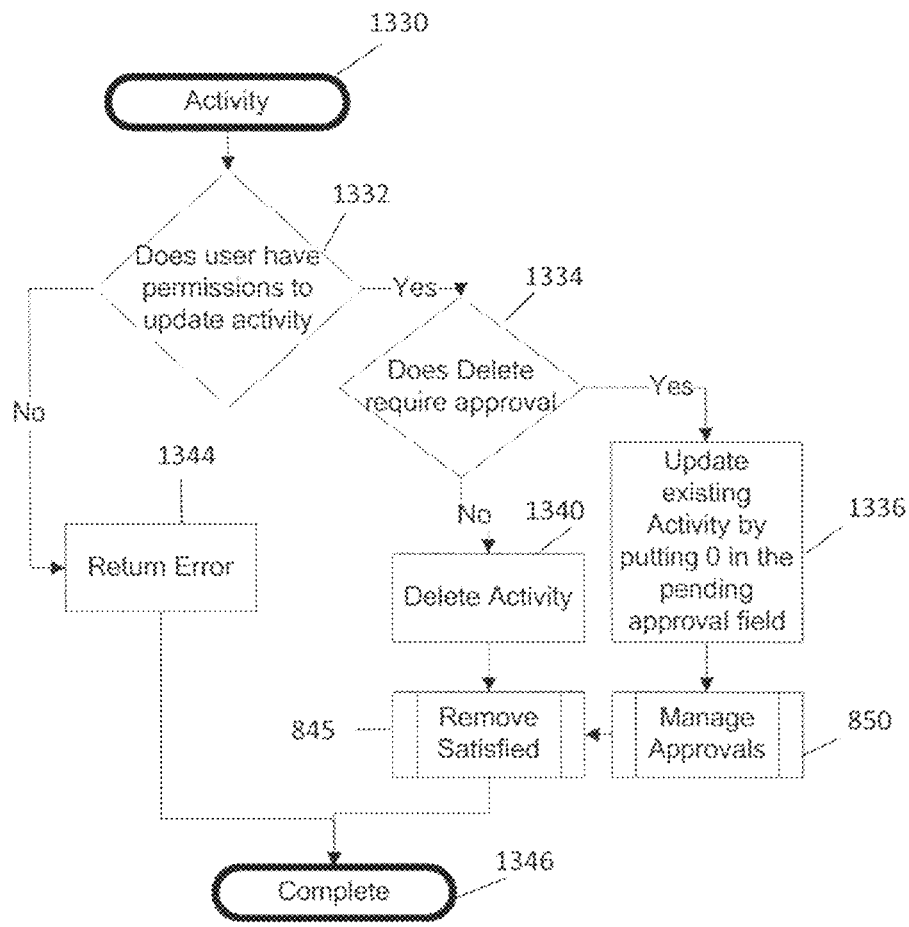
FIG. 8G is a flow diagram showing an example process for a delete activity function, performed according to principles of the disclosure.
Figure 8H:
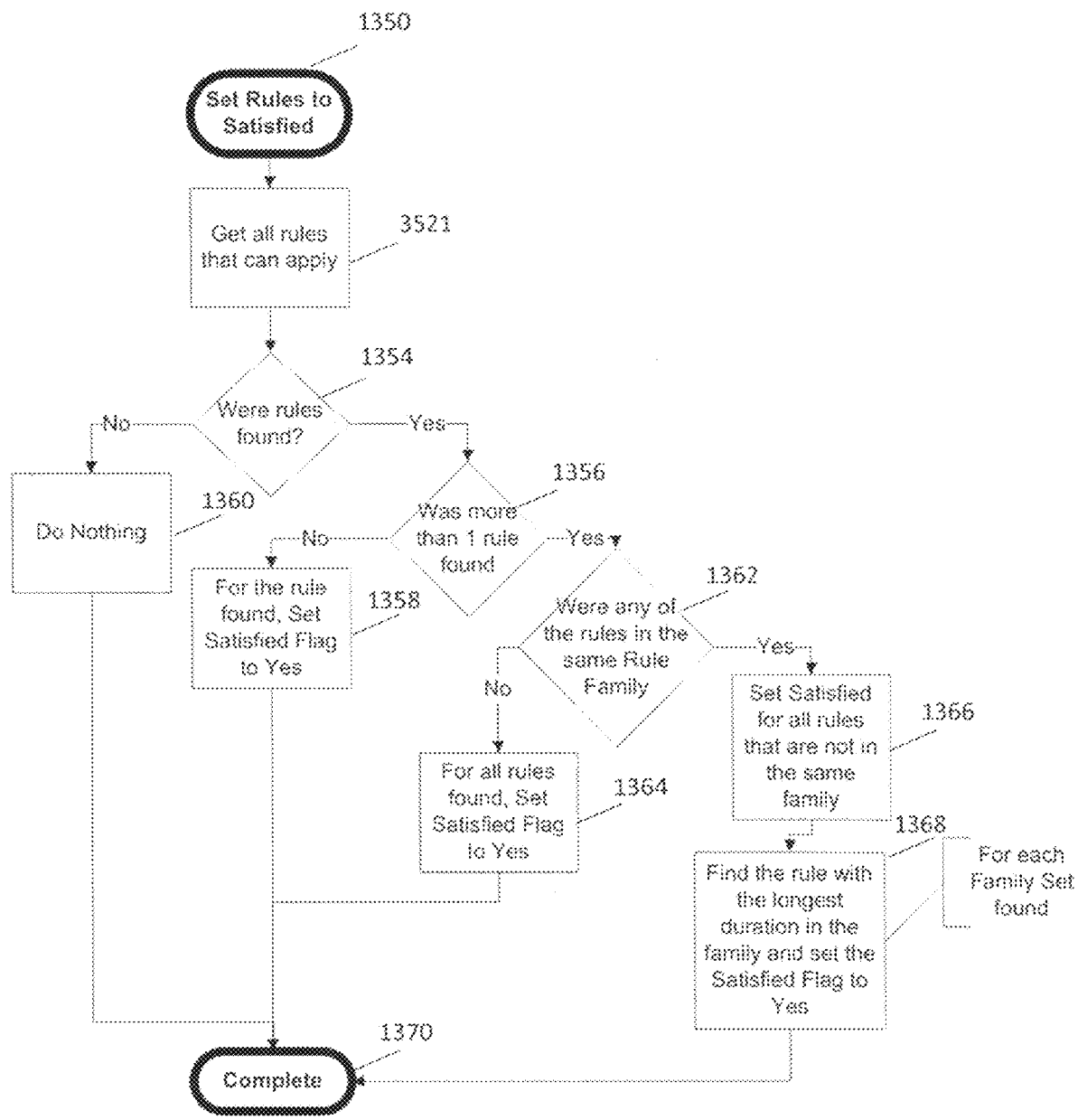
FIG. 8H is a flow diagram showing an example process for set rules to satisfied function, performed according to principles of the disclosure.
Figure 8I:
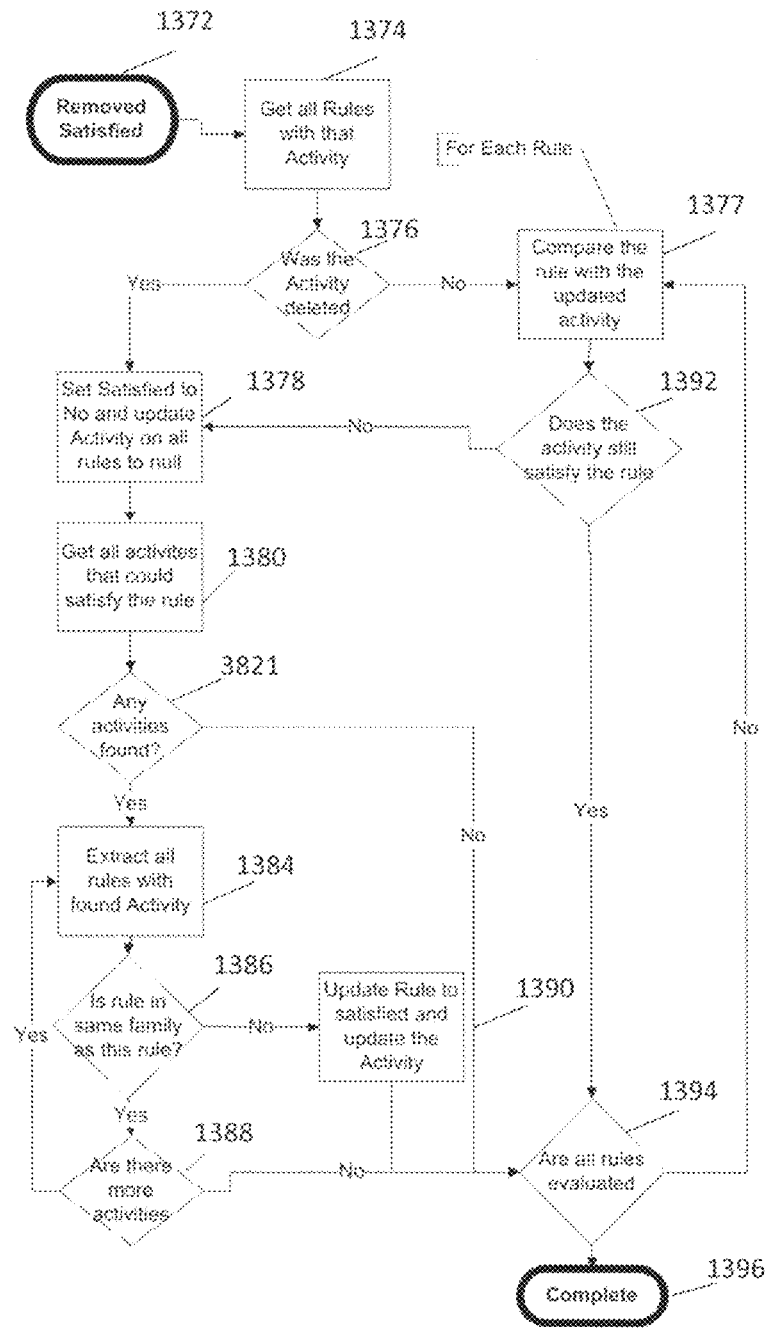
FIG. 8I is a flow diagram showing an example process for remove satisfied function, performed according to principles of the disclosure.
Figure 8J:
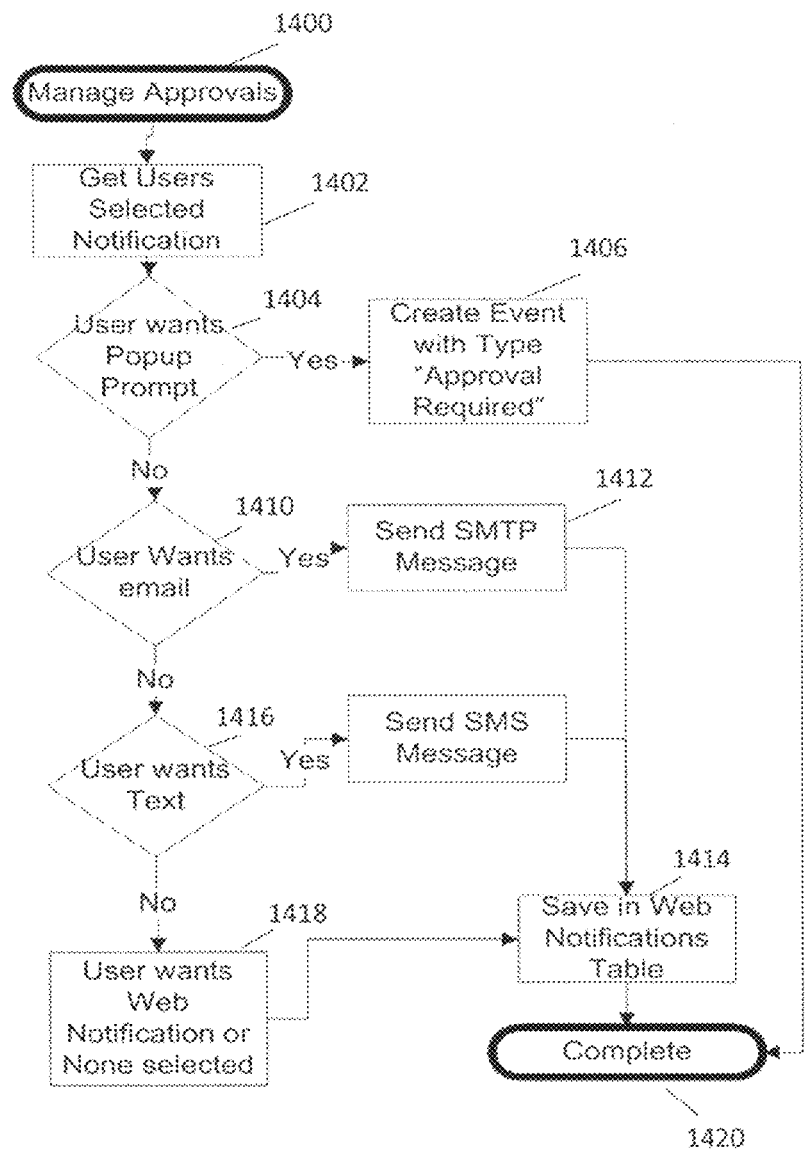
FIG. 8J is a flow diagram showing an example to manage approval notification process, performed according to principles of the disclosure.
Figure 8K:
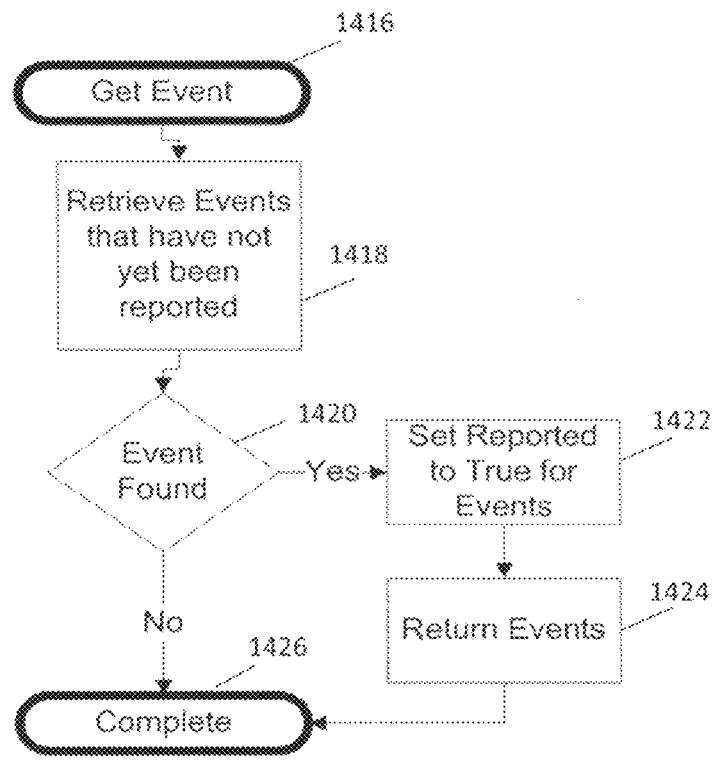
FIG. 8K is a flow diagram showing an example process to receive new external events using a get event function, performed according to principles of the disclosure.
Figure 8L:
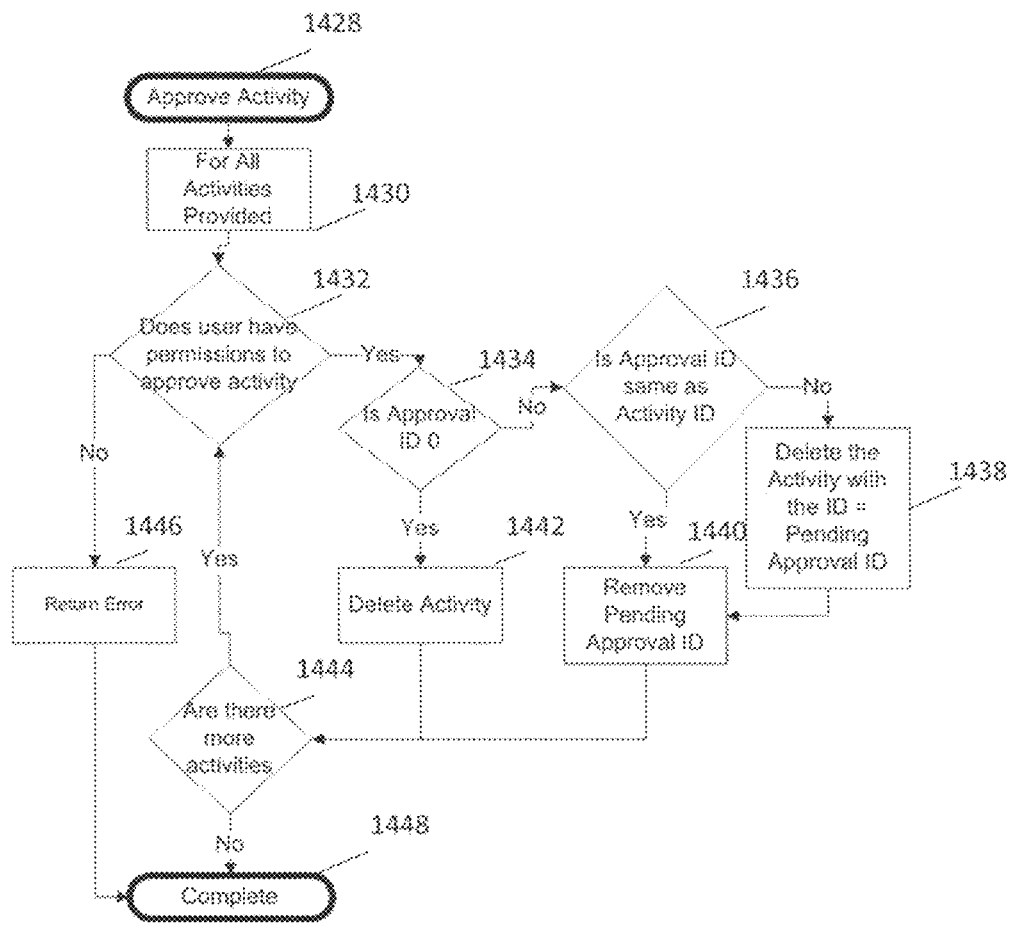
FIG. 8L is a flow diagram showing an example process for approve activity function performed according to principles of the disclosure.
Figure 8M:
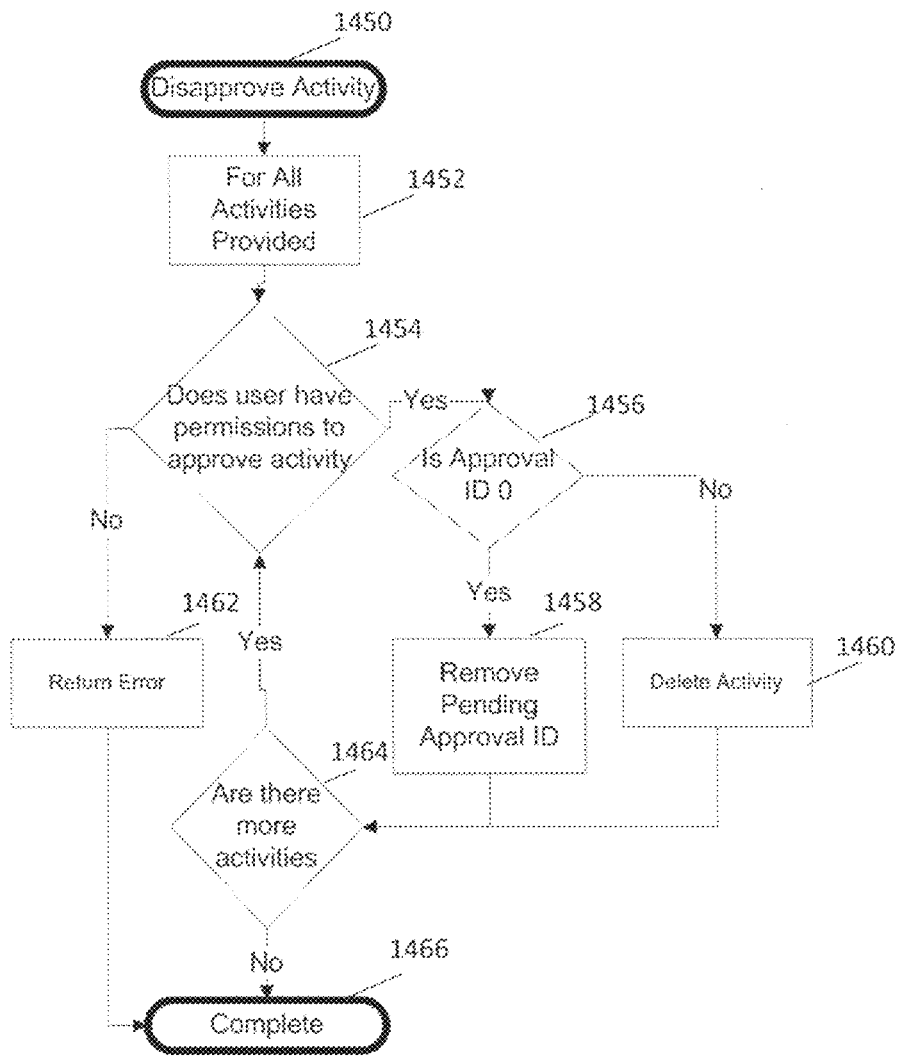
FIG. 8M is a flow diagram showing an example process for disapprove activity function performed according to principles of the disclosure.

837—Disapprove Activity (List of Activities) (see FIG. 8M for an example flow diagram)

a. This may allow a user to disapprove one or more activities. It may accept a list of activities to provide the developers of interfaces the ability to have an "Approve All" feature.

800—Location Prompt Helper (Lat, Long, Radius) (see FIG. 8N for an example flow diagram)
a. This simple function takes a Target Lat, Long and mile radius as parameters.
b. It then leverages the GPS to determine current Lat, Long.
c. It may return one if the current location is in the radius
d. It may return zero if the current location is outside the radius
e. It may return nine if the GPS accuracy is poor 838—Get GeoCode (Location Name) (see FIG. 8O for an example flow diagram)
a. This function may return Null if the service is down. It may make a call to a Geocoding service (Example: Google Maps)
b. If the function is available, the application may return the Geo Code for the location found, or a request for more information if more than one location is found.

FIG. 8B is a flow diagram showing an example process for a create activity, performed according to principles of the disclosure, starting at step 850. This flow corresponds to the create activity function 821 shown in FIG. 8A. At step 855, a check is made to determine if a user has permission to create an activity. If the user does not have permission, then at step 875, an error code may be returned. If the user does have permission, then at step 860 a check is made to determine if the log permits overlap. If so, then the process continues at step 880. If not, then at step 865, a query may be made for existing activities with an overlapping start and end date. At step 870, a check may be made to determine if there are any conflicts found. If there are conflicts, an error code may be returned. Otherwise, if no conflicts are found, then at step 880 an activity may be created. At step 840, the rule or rules may be set to satisfied. At step 850, a check is made to determine if the activity requires approval. If not, then the process completes at step 897. If the activity requires approval, then at step 875 approvals are managed and obtained. At step 897, the process may end.

FIG. 8C is a flow diagram showing an example process for a start activity, performed according to principles of the disclosure, starting at step 900. This flow corresponds to the start activity function 816 shown in FIG. 8A. At step 902, a check may be made to determine if the user has permission to create activity. If not, then an error code may be returned at step 912. If the user does have permission, then at step 904, a check may be made to see if there is current activity in the log. If not, then at step 905 a return error code of "Only 1 Current Activity Allowed" indicating there is already a current activity in the log may be set and the process may complete at step 930. However, if there is no current activity at step 904, then at step 906 a check may be made to determine if the log allows overlap. If so, then processing continues at step 914. If overlap is not permitted, then at step 908 a query may be made for existing activities with overlapping start and end times. At step 910, a check may be made to determine if any conflicts are found. If yes, then return an error code at step 912. If, however, there are no conflicts found at step 910, then at step 914 a check may be made to determine if a location was provided with this request. If not, then at step 918 a current location of the mobile units 105a-105c may be determined using GPS 113a-113c. Processing may continue at step 920. If at step 914, a current location was passed into this function, then at step 916, the current time may be acquired from a clock 265. At step 920, a check may be made to determine if the GPS data is accurate. If the GPS data is deemed not accurate, one or more attempts to acquire accurate GPS data may be attempted at step 924. If the GPS data is deemed accurate then processing continues at step 922, otherwise if the GPS data is deemed not accurate an error code may be set at step 228 and the process may complete at step 930. If the GPS data is deemed accurate at step 922, then an activity may be created with current location and time. The process may complete at step 930.

FIG. 8D is a flow diagram showing an example process for an end activity, performed according to principles of the disclosure, starting at step 932. This flow corresponds to the end activity function 817 shown in FIG. 8A. At step 934 a check is made to determine if a user has permissions to create an activity. If not, then an error code may be returned at step 946. If the user has permissions, then at step 936 a check may be made if there is a current activity in the log. If not, then at step 938 a no current activity error code may be returned. However, if there is a current activity at step 936, then at step 940 a check may be made to determine if the log allows overlap. If so, then processing continues at step 948. If overlap is not permitted, then at step 942 a query may be made for existing activities with overlapping starting and end times. At step 944, a check may be made to determine if any conflicts are found. If yes, then return an error code at step 946. If, however, there are no conflicts found at step 944, then at step 948 a check may be made to determine if a location was provided with this request. If not, then at step 952 a current location of the mobile units 105a-105c may be determined using GPS 113a-113c. Processing may continue at step 956. If at step 948, a current location was passed into this function, then at step 950, the current time may be acquired from a clock 265. At step 954, a check may be made to determine if the GPS data is accurate. If the GPS data is deemed not to be accurate, one or more attempts to acquire accurate GPS data may be attempted at step 956. If the GPS data is deemed accurate at step 958, then processing continues at step 962; otherwise, if the GPS data is deemed not to be accurate at step 958, an error code may be set at step 960 and the process may complete at step 968. If the GPS data is deemed accurate at step 962, then an activity may be created with current location and time. The rules may be set to satisfied at step 840. The process may complete at step 930.

FIG. 8E is a flow diagram showing an example process for a search activity, performed according to principles of the disclosure, starting at step 1270. This flow corresponds to the search activity function 826 shown in FIG. 8A. At step 1272 using criteria provided, locate all activities that match. At step 1274, for each log activity, a check is made to determine if the user has permission to view the log. If not, then no activity is added to the result. If the user does have permission, then at step 1278, the activity or activities may be added to the result. At step 1282, a check is made to determine if there are more activities in the search result. If there are, processing continues at step 1276. If not, the process completes at step 284 returning the result.

FIG. 8F is a flow diagram showing an example process for an update activity, performed according to principles of the disclosure, starting at step 1300. This flow corresponds to the update activity function 831 shown in FIG. 8A. At step 1302 a check may be made to determine if the user has permission to update activity. If not, then an error may be returned at step 1310. If the user has permission, then at step 1304 a check may be made to determine if the log allows overlap. If not, then at step 1306 a query for existing activities may be made with overlapping start and end points. At step 1308, a check may be made to determine if any conflicts are found. If there are any conflicts, then at step 1310 an error result may be returned. If, however, there are no conflicts at step 1308, then processing continues at step 1314. If at step 1304, the log allows overlap, then at step 1314 a check may be made to determine if the update requires approval. If not, then at step 1322 the activity may be updated, and processing continues at step 1324. If at step 1314, the update requires approval, then at step 1316, a new activity may be created with information for the update. At step 1318, update existing activity with a new ID in pending approval field. At step 850, the approval is managed. At step 845 satisfied may be removed for the activity. At step 840, the rules may be set to satisfied. At step 1312 the process may complete.

FIG. 8G is a flow diagram showing an example process for a delete activity, performed according to principles of the disclosure, starting at step 1330. This flow corresponds to the delete activity function 832 shown in FIG. 8A. At step 1332 a check is made to determine if the user has permission to update activity. If not, then an error may be returned at step 1344. If the user has permission, then at step 1334 a check may be made to determine if the delete requires approval. If not, then at step 1340 the activity may be deleted. If, however, approval is required, then at step 1336 update to the existing activity is marked by a "0" indicating pending approval for deletion. At step 850 the approval for deletion is managed. At step 845, the removal may be satisfied, the activity effectively deleted. The process ends at step 1346.

FIG. 8H is a flow diagram showing an example process for set rules to satisfied, performed according to principles of the disclosure, starting at step 1350. This flow corresponds to the set rules to satisfied function 840 shown in FIG. 8A. Every time an activity is created or updated, this function may be called. The remove satisfied function (FIG. 8I) should be called before this set rules to satisfied function for every update. At step 1352, all rules that apply are obtained. This may include a query for rules for period where a valid start is before activity start, a valid end is after activity start and through join, the rules should be associated to this activity type. Rules should not already be marked satisfied. At step 1354 a check may be made to determine whether or not any rules were found. If not, then at optional step 1360 there is nothing to do and the process returns at step 1370. If there is at least one rule found, then at step 1356 a check is made to determine if more than one rule was found. If no, then at step 1358 for the rule found set satisfied flag to yes. The process completes at step 370. If at step 1356, more than one rule was found, then at step 1362 a check may be made to determine if any of the rules are in the same family. If not, then at step 1364 the satisfied flag may be set to yes for all rules found, and the process completes at step 1370. If at step 1362 there are rules in the same family, then at step 1366 the satisfied flag may be set for all rules not in the same family. At step 1368, for each family set found, locate the rule with the longest duration in the respective family and set the satisfied flag to yes. The process ends at step 1370.

FIG. 8I is a flow diagram showing an example process for remove satisfied, performed according to principles of the disclosure starting at step 1372. This flow corresponds to the remove satisfied function 845 shown in FIG. 8A. Every time an activity is created or updated, this function may be called. At step 1374, all rules with the Activity may be obtained which may include querying for rules with that Activity from the rules for period. At step 1376 a check may be made to determine if the activity was deleted. If yes, then at step 1378 satisfied may be set to no and update Activity on all rules to null. At step 1380, all activities that could satisfy the rule are obtained. At step 1382, a check may be made to determine if any activities were found. If not, processing continues at step 1394. If an activity was found, then at step 1382 all rules having the Activity may be extracted. At step 1386, a check may be made to determine whether or not the extracted rule is in the same family as this rule. If yes, then at step 1388 a check is made to determine if there are more activities. If yes then processing continues at step 1384, if not, then processing continues at step 1394. If at step 1386, the rule is not in the same family as this rule, then at step 1390 the rule is updated to satisfied and Activity may be updated. Processing continues at step 1394.

If at step 1376 the activity was determined not to be deleted, then at step 1377 for each rule, compare the rule with the updated activity. At step 1392, a check may be made to determine if the activity still satisfies the rule. If not, the processing continues at step 1378. However, if the activity still satisfies the rule, then at step 1394 a check may be made to determine if all rules have been evaluated. If not, then processing continues at step 1377 with the next rule. If all rules have been evaluated, then at step 1396, the process may end.

FIG. 8J is a flow diagram showing an example process for manage approval performed according to principles of the disclosure, starting at step 1400. This flow corresponds to the manage approvals function 850 shown in FIG. 8A. At step 1402 obtain users selected preferred notification mode, for sending notifications to the user's device 110*a*, or user interface 114*a*. At step 404, a check is made to determine whether or not the user wants a pop-up prompt. If yes, then at step 1406 an event may be created with type "approval required." At step 1420 the process end. If no at step 1404, then at step 1410 a check is made to determine if the user wants email notification. If yes, then at step 1412 an email may be prepared and sent such as via, e.g., simple mail transport protocol (SMTP), and processing continues at step 1414. If no at step 1416, then at step 1418 may want web notification, the notification may be saved in the web notifications table at step 1414 for eventual display to the user on, e.g., user interface 114*a*. Alternatively, if the user elected for no notifications, the process ends at step 1420

FIG. 8K is a flow diagram showing an example process for get event performed according to principles of the disclosure, starting at step 1416. This flow corresponds to the get event function 805 shown in FIG. 8A. At step 1418 the events database 225 may be queried to retrieve events that have not yet been reported. Reported acts is a control to ensure that events are only reported one time, preventing duplicate activities or prompts being provided to the user. At step 1420 a check is made to determine if an event has been found with the event type. If yes, then set reported to true for events and return event(s). At step 1426 the process ends.

FIG. 8L is a flow diagram showing an example process for approve activity performed according to principles of the disclosure, starting at step 1428. As an action may be approved or disapproved by a user at a later time, the state of the activity for approval could be stored with an "Approval ID". The Approval ID could indicate 3 possible states. If the Approval ID is 0, the user is approving a delete, if the Approval ID is the same as the Activity ID, then the user is approving a create, lastly if the Approval ID is the ID of another activity, this is an update. This flow corresponds to the approve activity function 836 shown in FIG. 8A. At step 1430, for all activities provided as parameters, at step 1432 a check is made to determine if the user has permission to approve the activity. If not, at step 1446 an error is returned and the process completes at step 1448. If the user does have permission, then at step 1434 a check may be made to determine whether the Approval ID is zero. If yes, then at step 1442, the activity may be deleted and the process continues at step 1444. If, however, the Approval ID is not zero, then at step 1436 a check may be made to determine whether or not the Approval ID is the same as the Activity ID. If the Approval ID is not the same as the Activity ID, then the activity with the ID equal to the pending Approval ID may be deleted. Processing continues at step 1440. Otherwise, if the approval_ID is the same as the Activity ID, then at step 1440 the pending Approval ID is removed. At step 1448 the process ends.

FIG. 8M is a flow diagram showing an example process for disapprove activity performed according to principles of the disclosure, starting at step 1450. As an action may be approved or disapproved by a user at a later time, the state of the activity for approval could be stored with an "Approval ID". The Approval ID could indicate 3 possible states. If the Approval ID is 0, the user is approving a delete, if the Approval ID is the same as the Activity ID, then the user is approving a create, lastly if the Approval ID is the ID of another activity, this is an update. This flow corresponds to the Disapprove activity function 837 shown in FIG. 8A. At step 452, control is established to process all activities provided. At step 1454 a check may be made to determine whether or not the user has permission to approve an activity. If not, an error may be returned at step 1462. If the user has permission, then at step 1456 a check may be made to determine whether or not the Approval ID is zero. If not 0, then the activity should be deleted as it represents an unapproved create or updated activity, processing continues at step 1464. If the Approval ID is zero, then the pending Approval ID is removed to reflect the unapproved delete of the activity. At step 1464 a check may be made to see if there are more activities. If so, then processing continues at step 1454 for the next activity. If not, then processing ends at step 1466.

Figure 8N:
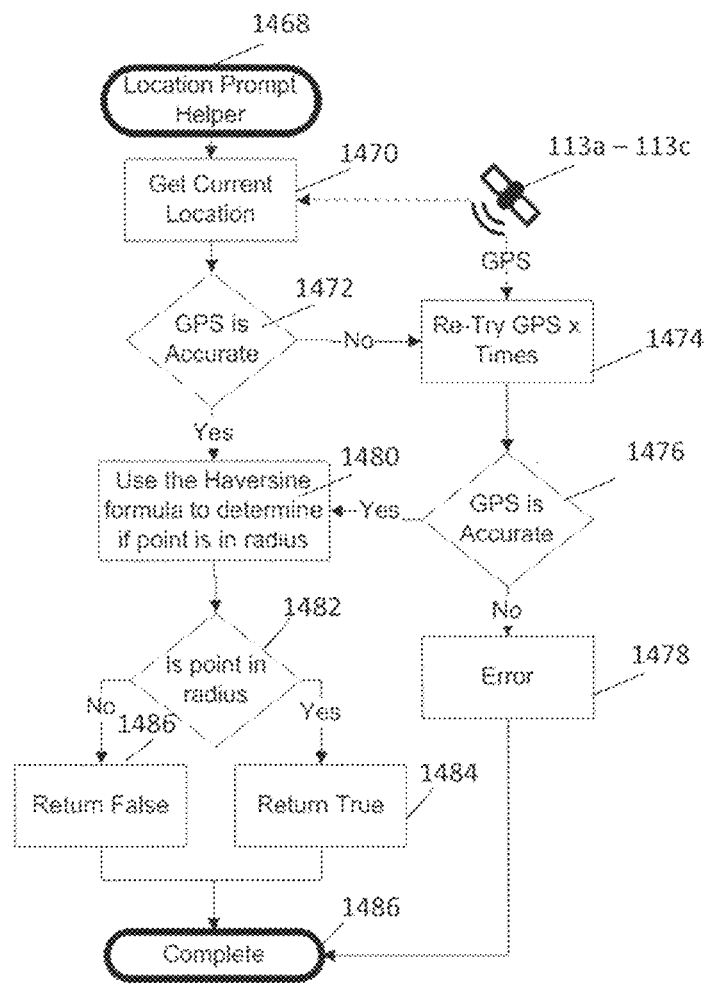
FIG. 8N is a flow diagram showing an example process to create consistent location calculations based on a GPS reading, performed according to principles of the disclosure.

FIG. 8N is a flow diagram showing an example process for a location prompt helper performed according to principles of the disclosure starting at step 1468. The location prompt may be used to compare the position of a mobile unit 105a-105c and another location. The process would determine if the mobile unit is within a specific configured distance, which could be done using the Haversine formula or other geographic distance formula to determine if a point falls within a radius of another point. This flow corresponds to the location prompt helper function 800 shown in FIG. 8A. At step 1470, the current location of the mobile unit 105a-105c may be obtained using GPS 113a-113c. A check may be made at step 1472 to determine if the GPS data is accurate. If not accurate, then at step 1474 retries may be attempted to acquire accurate GPS data. If the GPS data is deemed accurate at step 1472 or step 1476, then at step 1480 the Haversine formula may be used to determine if the GPS point falls inside the radius of a given location. If not, then at step 1486 false may be returned. If within radius, a true may be returned, the process ends at step 1486.

Figure 8O:
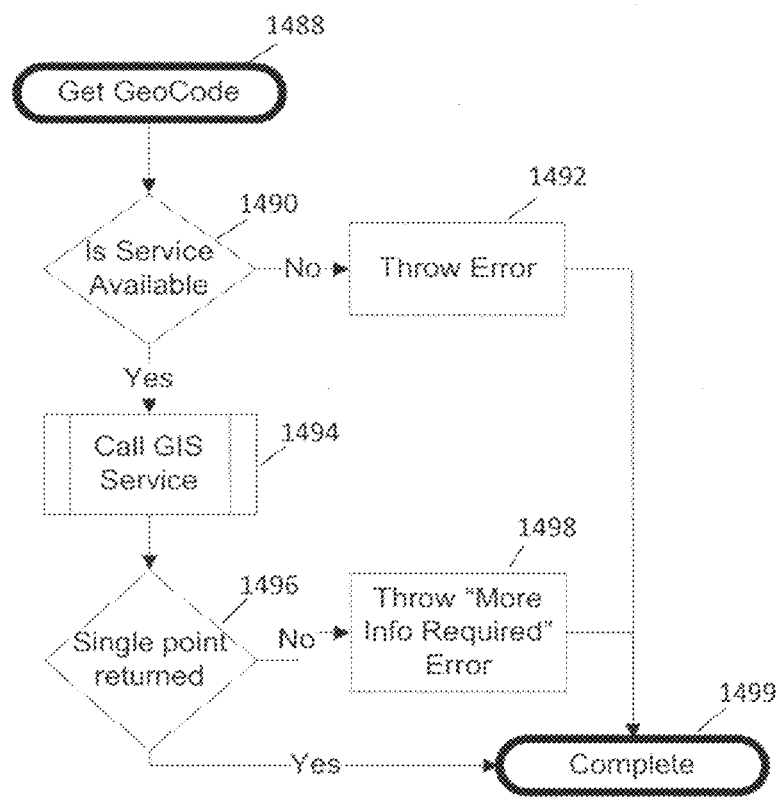
FIG. 8O is a flow diagram showing an example process to interact with a GIS service for a get geocode function, performed according to principles of the disclosure.

FIG. 8O is a flow diagram showing an example process for a get geocode performed according to principles of the disclosure, starting at step 1488. This flow corresponds to the get geocode function 838 shown in FIG. 8A. At step 1490, a check may be made to determine whether or not a network link 130 is available. If not, an error is returned at step 1492 and processing ends at step 1499. If a network link 130 is available, then a GIS service may be called at step 1494 providing a name of a location, e.g., an address, a city, a county or a zip code. At step 1496, a check may be made to determine if a single point geocode was returned. If not, an error may be returned indicating more information required. The process may end at step 1499.

Figure 9:
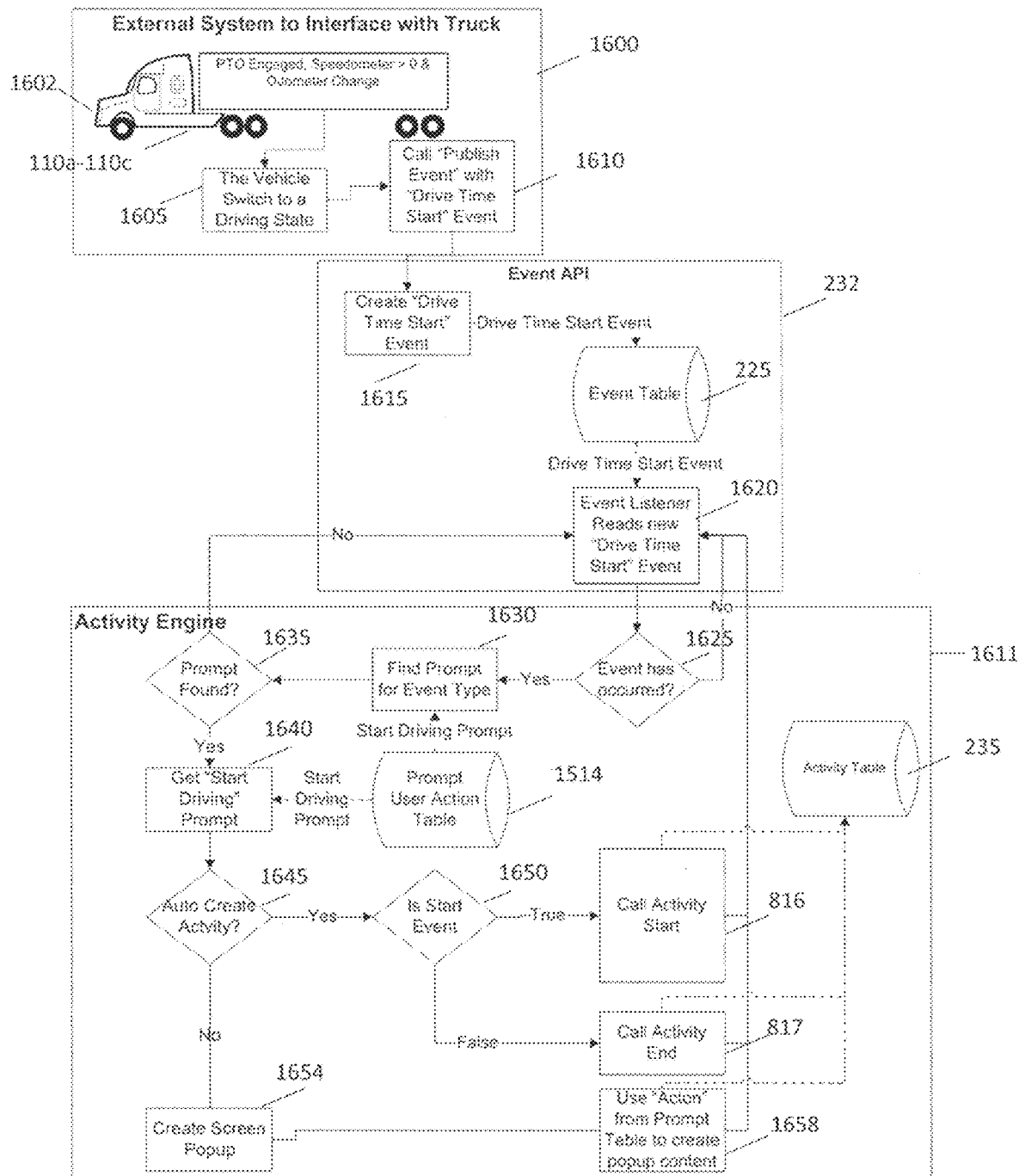
FIG. 9 is a functional block diagram of an event API 232 including a set of methods to permit an external system to interact with an activity engine of server, configured according to principles of the disclosure.

FIG. 9 is a functional block diagram of an event API 232 to provide an example of how an activity such as Drive Time Start Event could be processed to manage an activity. This Figure shows how a vehicle 112a could interact with a mobile device 135 including a set of methods to permit an external system 1600 to interact with an activity engine 1611 of Mobile Device 135, configured according to principles of the disclosure. The external system 1600 may be a separate platform for a transportation company or other entity for which logging, tracking and services provided by system 100 is desired, or may be a Vehicle 112a-112c. In this example, a vehicle 112a-112c which may be equipped with onboard monitoring electronics 1602 which may include a CAN bus that may sense and provide real-time information related to the status and state of the vehicle 112a-112c that may sense the PTO engaged with a speedometer indicating a speed greater than zero and the odometer may be changing. This information or the like may be communicated to the respective computing device 110a-110c. At step 1605 the on-board monitoring electronics has detected that the vehicle has switched to a drive state. The onboard control logic, may be interpreted by a broadband router 121 or other device, which could then call "publish event" with a "drive time start" event at step 1610 using event API 232 which creates a "drive time start event" at step 1615 for entry into event table 225. An event listener 1620 may query the event table 225 for an event on a predetermined schedule, such as, e. g., every 1, 5 or 10 secs, or other configurable time period. Once the event listener 1620 discovers an event, the methods in the Activity Engine 1561 may be called to find out what to do with the event. At step 1625, a check may be made to determine if an event occurred. If not, the event listener 1620 continues to query for an event. If an event has occurred, at step 1630 a search for prompt for the event type may be initiated using a prompt user table 1514. At step 1635, a check may be made to determine if a prompt was found for the event type. If not, the event listener 1620 continues to query for an event. If found, at step 1640 the prompt for start driving may be retrieved from the prompt user action table 1514. A check may be made to determine if this is an auto create activity at step 1645. If yes, then at step 1650 a check may be made to determine if this is a start of event. If yes, then call activity start function 816, which updates the activity table 235. If not a start of event then call activity end 817, which updates the activity table 235. If at step 1645 it was determined that this is not an auto create activity, then at step 1654 a screen pop-up may be created for the user interface. At step 1658, the action (created in 791) from the prompt table may be used to create the pop-up content, which may be returned to the computing device 110a-110c. The process may continue as the event listener continues to scan the event table 225 for a new event.

In the example of FIG. 9, the event API 232 may create a new Event with the following example information (note the Event Type should already exist). TABLE 14 illustrates an event type table. TABLE 15 illustrates an event table.

TABLE 14

Event Type Table

| Event Type ID | Name |
|---|---|
| 543 | Drive Time Start |

TABLE 15

Event Table

| Event ID | Event Type ID | Event Time | Activity ID | Event Reported |
|---|---|---|---|---|
| 101 | 543 | Aug. 22, 2016 14:06:00 | <null> | False |

In Table 15, Event ID is a system generated number. Event Type ID may be looked up based on the name provided to create. Event Time is a time stamp. If the time is provided by the calling application, that time is used. If none is provided, the timestamp is the current time. Activity ID may be populated after an activity is created. Event Reported is set to false to indicate to the event listener 1620 that this event has not yet been found.

When the activity engine 1611 finds an event, it sets Event Reported to True, this is shown below in TABLE 16.

TABLE 16

Event Table

| Event ID | Event Type ID | Event Time | Activity ID | Event Reported |
|---|---|---|---|---|
| 101 | 543 | Aug. 22, 2016 14:06:00 | <null> | True |

The Activity Engine 1611 may search the prompt user action table 1514 for an Event Type. TABLE 17 illustrates an example of the prompt user action table 1514. An example of a record is shown below. The Activity Name is Driving. Auto create is true.

TABLE 17

Prompt User Action

| Rule Id | Action | Prompt Time Minutes | Prompt Location Miles | Event Type ID | Auto Create Activity | Is Start Event | Activity Type ID |
|---|---|---|---|---|---|---|---|
| 947 | <null> | <null> | <null> | 543 | True | True | 2 |

Activity Type

| Activity Type Id | Parent ID | Act'ty Name | User Can Edit | User Edit Days | Office Can Edit | Office Edit Days | User Approv Req'd | Office Approv. Req'd | Log Type Id |
|---|---|---|---|---|---|---|---|---|---|
| 2 | <null> | Driving | True | 90 | True | 365 | True | False | 33 |

Events can start or end an activity. In this example this is a start event so it may be used to create an activity. This is accomplished by calling Activity Create 816 in the Activity Logger API. An activity may be created that looks like that looks like TABLE 18.

TABLE 18

Activity Table

| Activity ID | Log ID | Activity Type ID | Start Time | End Time | User Created | Version |
|---|---|---|---|---|---|---|
| 325 | 888 | 2 | Aug. 22, 2016 14:06:00 | <null> | False | 1 |

Activity Table (Continued)

| Approved | Start Lat | Start Long | End Lat | End Long | Current | Pending Approval ID |
|---|---|---|---|---|---|---|
| True | 40.7484405 | −73.9856644 | <null> | <null> | True | <null> | i. Activity ID may be a random number
ii. Log ID may be the user's log that matches the Log Type in the Activity Log Type (33)
iii. Activity Type ID is the ID of the type of activity that is being created. In this example that is 2 (Driving) as seen in the Activity Type table above.
iv. Start Time: the timestamp is used on the event shown above.
v. End Time: As this activity is not completed, just being started the end time is null. Note, this is not a valid activity until this ends.
vi. User Created: This was created by the system not the user or by the back office.
vii. Version: The activity may show version 1 to indicate that it has not been changed.
viii. Approved: drivers not expected to approve automated action.
ix. Start Lat & Long: These are the Lat & Long of the position at time Start Activity was called.
x. End Lat & Long: These are null as we have not ended the activity yet.
xi. Current: As this is the Current Activity (can only have 1 at a time per log), set it to True.
xii. Pending Approval: The activity doesn't need to be approved so this is set to <null>.

The system 100 may also record driver data including identification data and authentication data. In this way a historical record of the driver may be maintained. The record may include which mobile units were driven by the driver, geographic route, date, times and duration of driver activity. The record may comprise an aggregated historical record to consolidate a driver's history over multiple mobile units. Driver activity may be maintained in a central database and may be collected via satellite or wireless communication link. A driver's recorded historical activities may also be employed to compute billing, pay, and taxes.

This system provides a geographic regulatory compliance toolset to manage a mobile workforce. By leveraging the power of a Global Positioning System and a Geographic Information System, our tool provides a powerful geographic business rules engine to use real-time location tracking to determine specific regulations and policies that a mobile user must comply with. The system combines expected user tasks, route, optimized break plan and user input to develop an organized plan that will be managed though a common view, that clearly depicts all activities expected of the user. Workday plans are fluid and can be updated by end users or back office to ensure clear communication of expectations.

The system and methods according to principles of this disclosure may include compliance management processes to increase organizational compliance to regulations and policies, which may include notifications to a user of upcoming actions required to improve personnel compliance with jurisdictional regulations and company policies. Multiple notification methods may be provided, including methods that provide a safe experience for a driver. The system and methods according to principles of this disclosure may notify a user and others of real-time compliance issues in order that the situation may be managed, rectified, or dealt with as they occur or before they occur.

The optimizer according to principles of this disclosure maximizes workforce productivity by recommending, e.g., optimal time blocks to take a breaks based on the driver current previous, current and future locations and the regulations and associated policies. The optimizer integrates a work plan to provide a singular experience for a user to manage and track their day The system according to principles of this disclosure includes standard inputs to create events and activities. To reduce the need for end user data entry, events provide a way to assist or automate activity creation. Standard event processing for geo-position is provided using a GPS device to provide the ability to create an event based on the user's current physical location. Another standard event generator may originate from a vehicle connection with key event interpretation and management. The system may also include a standard method to connect to external inputs for expanded capability.

In one aspect, according to principles of this disclosure, an activity management system may provide a centralized record of activities for a multiplicity of users, and related regulations to maintain regulatory compliance verification. The activity management system may simplify compensation and maximize billing processes by using individuals' activities extracted from the centralized records, such as a database.

In one aspect, the system and methods according to principles of this disclosure system may provide maximum flexibility by providing a simple configuration process for rules, activities and events. Configurations may be sent to end user devices without requiring software updates or installs to simplify and expedite the process of rolling out.

Activity Types, Event Types and Rules can be created, updated and deleted on a server, and passed to one or more mobile units. Upon receiving these changes, the end user application at the one or more mobile units can enforce new rules, permit new activity types and automate or prompt new actions, based on events. The operation of the application at the mobile unit may be dynamically modified by these changes, providing a dynamic nature of its configuration, while keeping foundational abilities as described herein.

The system configured according to principles of the disclosure may employ several transactional elements that may be dynamically used to create and monitor rules, activities, and events to provide a record of what was required, and what was done. Beyond recording, the system configured according to principles of the disclosure may use this information to provide feedback to a user to enable the user to improve performance. To do this, rules that need to be complied with may be dynamically identified from the set of configured rules, based on a user's role, and location. These rules may be assigned a time period in which the rules need to be enforced based on when the user entered that location. The system configured according to principles of the disclosure may also include events, which are moments in time that something occurred; these events may be trigged by, e.g., time, location, server communication, or a vehicle. The events may be used to create activities, and as the activates are created, activities are applied to the rule set to which a user must comply, to show compliance as it occurs.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed:
1. A system comprising:
a memory having computer-readable instructions stored thereon; and a processor that executes the computer-readable instructions to:
receive a first current location of a mobile unit;
identify a set of a plurality of rules based on the first current location, the plurality of rules corresponding to a task for completion by an individual associated with the mobile unit;
receive an activity related to the individual, the activity comprising a second current location; and
identify at least one rule from the set of the plurality of rules that applies to the activity to determine compliance based upon a valid time period of the at least one rule.

2. The system of claim 1, wherein the processor further executes the computer-readable instructions to:
determine that the mobile unit has entered a new geographical region based upon a third current location of the mobile unit; and
update the set of the plurality of rules based on the third current location.

3. The system of claim 2, wherein the processor further executes the computer-readable instructions to determine if the set of the plurality of rules is to be updated based upon passing of a predetermined period of time or passing of a predetermined distance of the mobile unit.

4. The system of claim 1, wherein the activity further comprises an activity start time; wherein the at least one rule from the set of the plurality of rules is identified based upon the at least one rule having a valid start time that is before the activity start time and a valid end time that is after the activity start time; and wherein the valid start time and the valid end time are associated with the valid time period of the at least one rule.

5. The system of claim 1, wherein the processor further executes the computer-readable instructions to allow a user to create a record of the activity after determining that the activity is already complete and that the individual did not record the activity.

6. The system of claim 1, wherein the processor further executes the computer-readable instructions to:
receive an event from the mobile unit; and
generate the activity based on the event.

7. The system of claim 6, wherein the event comprises data related to at least one of: a current speed of the mobile unit, an odometer reading of the mobile unit, or a power-take-off state of the mobile unit.

8. The system of claim 6, wherein the processor further executes the computer-readable instructions to:
identify an event type from the event; and
identify the activity associated with the event type.

9. The system of claim 6, wherein the processor further executes the computer-readable instructions to generate the activity from the event without user input or display a screen on a user interface upon receiving the event, wherein the screen is populated with details associated with the activity for user confirmation before generating the activity.

10. The system of claim 1, wherein the processor further executes the computer-readable instructions to send an alert to the individual upon receiving an activity start time of the activity to enter an activity end time of the activity based upon the valid time period of the at least one rule.

11. A method comprising:
receiving, by a processor, a first current location of a mobile unit;
identifying, by the processor, a set of a plurality of rules based on the first current location, the plurality of rules corresponding to a task for completion by an individual associated with the mobile unit;
receiving, by the processor, an activity related to the individual, the activity comprising a second current location; and
identifying, by the processor, at least one rule from the set of the plurality of rules that applies to the activity for determining compliance based upon a valid time period of the at least one rule.

12. The method of claim 11, further comprising:
determining, by the processor, that the mobile unit has entered a new geographical region based upon a third current location of the mobile unit; and
updating, by the processor, the set of the plurality of rules based on the third current location.

13. The method of claim 12, further comprising determining, by the processor, if the set of the plurality of rules is to be updated based upon passing of a predetermined period of time or passing of a predetermined distance of the mobile unit.

14. The method of claim 11, further comprising allowing, by the processor, a user to create a record of the activity after determining that the activity is already complete and that the individual did not record the activity.

15. The method of claim 11, further comprising:
receiving, by the processor, an event from the mobile unit; and
generating, by the processor, the activity based on the event.

16. The method of claim 15, further comprising:
identifying, by the processor, an event type from the event; and
identifying, by the processor, the activity associated with the event type.

17. The method of claim 15, wherein the event comprises data related to at least one of a current speed of the mobile unit, an odometer reading of the mobile unit, or a power-take-off state of the mobile unit.

18. The method of claim 15, further comprising automatically generating, by the processor, the activity from the event without user input or displaying a screen on a user interface upon receiving the event, wherein the screen is populated with details associated with the activity for user confirmation before generating the activity.

* * * * *